US011790224B2

(12) United States Patent
Modi et al.

(10) Patent No.: US 11,790,224 B2
(45) Date of Patent: Oct. 17, 2023

(54) MACHINE LEARNING FROM THE INTEGRATION FLOW METADATA

(71) Applicant: Oracle International Corporation, Redwood Shores, CA (US)

(72) Inventors: Rajan Mahendrakumar Modi, Highlands Ranch, CO (US); Viresh Chandrakant Amin, Sunnyvale, CA (US); Virupaksha Vajragiri, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 860 days.

(21) Appl. No.: 16/657,556

(22) Filed: Oct. 18, 2019

(65) Prior Publication Data

US 2020/0125948 A1    Apr. 23, 2020

Related U.S. Application Data

(60) Provisional application No. 62/748,423, filed on Oct. 20, 2018.

(51) Int. Cl.
*G06N 3/00* (2023.01)
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC ........... G06Q 10/00; G06Q 50/00; G06N 3/00
USPC ......................................................... 706/20
See application file for complete search history.

(56) References Cited

U.S. PATENT DOCUMENTS

| 7,535,479 | B2 * | 5/2009 | Okita ................ | G06Q 10/06 345/629 |
| 2006/0074736 | A1 * | 4/2006 | Shukla ............. | G06Q 10/06 717/100 |
| 2009/0049452 | A1 * | 2/2009 | Kriegel ............ | G06F 9/546 719/313 |
| 2015/0089415 | A1 * | 3/2015 | Lee .................. | G06Q 10/0633 715/765 |

(Continued)

OTHER PUBLICATIONS

"Iris Artificial Intelligence", Available Online at: https://www.snaplogic.com/products/iris-artificial-intelligence, Accessed from Internet on: Oct. 16, 2019, 6 pages.

(Continued)

*Primary Examiner* — Mustafa Iqbal
(74) *Attorney, Agent, or Firm* — Kilpatrick Townsend & Stockton LLP

(57) ABSTRACT

A method of generating and using a metadata files for integration flows may include analyzing definition files of integration flows to generate metadata files that include summary information for each of the integration flows. The method also includes extracting source-target relationships from the summary information for each of the integration flows and training a model using the plurality of source-target relationships. The method also includes receiving a source element from a current integration flow; providing the source element and characteristics of the current integration flow to the model; and receiving, from the model, recommended target elements to be connected to the source element in the current integration flow.

20 Claims, 20 Drawing Sheets

(56) References Cited

U.S. PATENT DOCUMENTS

| | | | | |
|---|---|---|---|---|
| 2017/0076246 | A1* | 3/2017 | Volkov | G06N 5/04 |
| 2019/0026634 | A1* | 1/2019 | Homeyer | G06N 5/04 |
| 2019/0205792 | A1* | 7/2019 | Huang | G06F 9/4881 |
| 2020/0372338 | A1* | 11/2020 | Woods, Jr. | G06N 3/08 |

OTHER PUBLICATIONS

"SnapLogic for B2B Integration", snapLogic Data Sheet, retrieved from: https://yculz33w9skgdkhey8rajqm6-wpengine.netdna-ssl.com/wp-content/uploads/2018/11/SnapLogic-for-B2B-Integration-Data-Sheet.pdf, on Oct. 16, 2019, 2 pages.

"The AI Mindset: Getting Started with Self-Service Machine Learning", Available Online at https://www.snaplogic.com/resources/videos/ai-mindset-self-service-machine-learning, Accessed from Internet on: Sep. 26, 2019, 4 pages.

"What does SnapLogic do?", Available Online at: www.snaplogic.com, Accessed from Internet on: Oct. 16, 2019, 6 pages.

Aslett; Matt, "SnapLogic unveils machine-learning-driven integration assistant". 451 Research, Apr. 20, 2017, 3 pages, Available Online at: https://yculz33w9skgdkhey8rajqm6-wpengine.netdna-ssl.com/wp-content/uploads/2017/08/451_Reprint_Snaplogic_20APR2017.pdf.

Benson; Greg, "How AI is Accelerating App and Data Integration", SnapLogic Innovation Day 2018, Available Online at: https://www.snaplogic.com/resources/videos/greg-benson-snaplogic-innovation-day-2018, 2018, 4 pages.

Frank; Blair Hanley, "SnapLogic's AI Simplifies Enterprise Software Connections", InfoWorld, Available Online at: https://www.infoworld.com/article/3191124/snaplogics-ai-simplifies-enterprise-software-connections.html, Apr. 19, 2017, 2 pages.

U.S. Appl. No. 16/566,490, filed Sep. 10, 2019, First Inventor; Syed Najeeb Andrabi.

U.S. Appl. No. 16/566,504, filed Sep. 10, 2019, First Inventor; Syed Najeeb Andrabi.

U.S. Appl. No. 16/566,511, filed Sep. 10, 2019, First Inventor; Syed Najeeb Andrabi.

* cited by examiner

```
"id": "SAMPL_OPPOR_DETAI_FROM_SALES_CLO_01.00.0000",
"icsproject": {
    "version": "01.00.0000",
    "percentageComplete": 100,
    "modelType": "FREEFORM",
    "projectCode": "SAMPL_OPPOR_DETAI_FROM_SALES_CLO",
    "processorCount": {
        "MESSAGE_TRACKER": 1,
        "TRANSFORMER": 2,
        "ACTIVITY_STREAM_LOGGER": 1,
        "SOURCE": 1,
        "TARGET": 1
    },
    "projectStyle": "App Driven Orchestration",
    "smarttags": "adapter:rest adapter:osc ",
```

FIG. 6

```
"orchestration": {
  "type": "ORCHESTRATION",
  "activities": [{
    "type": "RECEIVE",
    "application": "rest",
    "BusinessObject": ["\/opportunity\/{id}"],
    "Operation": ["GET"],
    "execute"}
  },
  {
    "type": "ACTIVITY_STREAM_LOGGER"
  },
  {
    "type": "TRANSFORMER",
    "sources": ["rest"],
    "target": "osc"
  },
  {
    "type": "INVOKE",
    "application": "osc",
    "BusinessObject": ["...Opportunity : OpportunityService"},
    "operation": ["...getOpportunity"}
  },
}
```

```
"Invoke": [
  {
1002 ⎯ "role": "source",
       "mep": "fire-and-forget",
1004 ⎯ "adapterName": "osc",
1006 ⎯ "Operation": {
         "JCAProperty": [
           {"generatePartnerLink": false},
           {"endpointWSDLURL": "AccountUpdate_GG_ENDPOINT.wsdl"},
           {"targetOperation": "process"},
           {"applicationVersion": 1}
         ],
         "Message": {
           "RootElement": "process",
           "messageContextRef": "messagecontext_7",
           "RootElementNS": "http://xmlns.oracle.com/cloud/adapter/osc/AccountUpdate_GG_REQUEST/types",
           "direction": "output"
         },
         "OperationName": "process",
         "Resource": {"Path": "../resources/application_1/outbound_2/resourcegroup_3/AccountUpdate_GG_REQUEST.jca"},
         "JCAFilePath": "../resources/application_1/outbound_2/resourcegroup_3/AccountUpdate_GG_REQUEST.jca",
         "direction": "outbound"
       },
       "adapterType": "app-adapter"
  },
```

FIG. 10A

```
{
    "role": "target",
    "mep": "push-sync",
    "adapterName": "rightnow",
    "Operation": {
        "JCAProperty": [
            {"generatePartnerLink": false},
            {"noSchemaSupportEnabled": true},
            {"selectedPrimaryObjects": "[Organization]"},
            {"operationPath": "Create"},
            {"targetOperation": "Create"},
            {"applicationVersion": "1_3"},
            {"generateInboundCredentials": true}
        ],
        "Message": [
            {
                "RootElement": "Create",
                "messageContextRef": "messagecontext_15",
                "RootElementNS": "http://xmlns.oracle.com/cloud/adapter/rightnow/CreateOrganization_REQUEST/types",
                "direction": "input"
            },
        ],
    }
}
```

1010 → "role": "target",
1012 → "adapterName": "rightnow",
1014 → JCAProperty section

FIG. 10B

MACHINE LEARNING FROM THE INTEGRATION FLOW METADATA

CROSS-REFERENCE TO RELATED APPLICATION

This application claims the benefit under 35 U.S.C. 119(e) of U.S. Provisional Application No. 62/748,423, filed Oct. 20, 2018, entitled "MACHINE LEARNING FROM THE INTEGRATION FLOW METADATA," which is incorporated herein by reference in its entirety.

BACKGROUND

Modern software environments include many different software tools that operate together to produce complex results from many different inputs. Outputs from one software tool may act as inputs to another software tool. In fact, many software tools are designed to be used in conjunction with other software tools in an integrated fashion instead of being designed to operate in a stand-alone architecture. However, given the number of software tools available, chaining together the sequential operation of multiple tools can be complex and difficult, particularly for repeated tasks in large computer systems.

To improve the quality of multi-process execution flows, many systems use a workflow management system that generates defined workflows. These workflows include sequences in which software tools are executed. Workflows also define how outputs from one software tool are routed as inputs to other software tools in the workflow. Workflows may have complex dependencies as well as sequential operations such that previous tools in the workflow finish execution before subsequent tools begin. Integration workflows can integrate the execution of applications together in automated processes that streamline complex tasks. In cloud environments, a number of components may be readily available to software designers that can be used to assemble integration workflows.

Despite the emergence of modern integration workflow tools, building workflows may still be complex and difficult for designers. For example, hundreds of software components may be available from which elements of an integration workflow may be selected. Designers often do not know how to best assemble integration workflows and can have difficulty selecting the proper software component for given circumstances.

BRIEF SUMMARY

In some embodiments, a method of generating and using a metadata files for generating integration flows may include receiving a plurality of definition files defining a plurality of existing integration flows. The method may also include analyzing each of the plurality of definition files to generate a plurality of metadata files comprising summary information for each of the plurality of integration flows. The method may additionally include extracting a plurality of source-target relationships from the summary information for each of the plurality of integration flows. The method may further include training a model using the plurality of source-target relationships; receiving a source element from a current integration flow; and providing the source element and one or more characteristics of the current integration flow to the model. The method may also include receiving, from the model, a plurality of recommended target elements to be connected to the source element in the current integration flow.

In some embodiments, a non-transitory computer-readable medium may include instructions that, when executed by one or more processors, cause the one or more processors to perform operations including receiving a plurality of definition files defining a plurality of existing integration flows. The operations may also include analyzing each of the plurality of definition files to generate a plurality of metadata files comprising summary information for each of the plurality of integration flows. The operations may additionally include extracting a plurality of source-target relationships from the summary information for each of the plurality of integration flows. The operations may further include training a model using the plurality of source-target relationships; receiving a source element from a current integration flow; and providing the source element and one or more characteristics of the current integration flow to the model. The operations may also include receiving, from the model, a plurality of recommended target elements to be connected to the source element in the current integration flow.

In some embodiments, a system may include one or more processors and one or more memory devices which may include instructions that, when executed by the one or more processors, cause the one or more processors to perform operations including receiving a plurality of definition files defining a plurality of existing integration flows. The operations may also include analyzing each of the plurality of definition files to generate a plurality of metadata files comprising summary information for each of the plurality of integration flows. The operations may additionally include extracting a plurality of source-target relationships from the summary information for each of the plurality of integration flows. The operations may further include training a model using the plurality of source-target relationships; receiving a source element from a current integration flow; and providing the source element and one or more characteristics of the current integration flow to the model. The operations may also include receiving, from the model, a plurality of recommended target elements to be connected to the source element in the current integration flow.

BRIEF DESCRIPTION OF THE DRAWINGS

FIG. 6 illustrates a portion of a metadata file extracted from the integration flow of FIG. 5, according to some embodiments.

FIG. 7 illustrates a continuation of the metadata file from FIG. 6, according to some embodiments.

FIG. 10A illustrates a portion of a metadata file derived from one or more definition files for an integration flow, according to some embodiments.

FIG. 10B illustrates a second portion of the metadata file specifying the target half of a source-target relationship, according to some embodiments.

DETAILED DESCRIPTION

Described herein, are embodiments implemented as part of a Data Integration Cloud (DIC). In general, data integration involves combining data residing in different data sources and providing users with unified access and a unified view of the data. This process often arises and becomes significant in many situations, such as merging commercial entities with existing legacy databases. Data integration is beginning to appear more frequently in Enterprise software systems as the volume of data continues to increase along with the ability to analyze the data to provide useful results ("big data"). For example, consider a web application where users can query a variety of types of travel information (e.g., weather, hotels, airlines, demographics, crime statistics, etc.). Instead of requiring all of these various data types to be stored in a single database with a single schema, an Enterprise application can instead use the unified views and virtual schemas in the DIC to combine many heterogeneous data sources such that they can be presented in a unified view to the user.

The DIC is a cloud-based platform for data transformation, integration, replication, and governance. It provides batch and real-time data movement between cloud and on-premises data sources while maintaining data consistency with default-tolerance and resiliency. The DIC may be used to connect to various data sources and prepare, transform, replicate, govern, and/or monitored data from these various sources as they are combined into one or more data warehouses. The DIC can work with any type of data source and support any type of data in any format. The DIC can use a Platform as a Service (PaaS) or Infrastructure as a Service (IaaS) architecture to provide cloud-based data integration for an Enterprise.

The DIC may provide a number of different utilities, including transferring entire data sources to new cloud-based deployments and allowing cloud databases to be easily accessed from the cloud platform. Data can be streamed in real-time to new data sources up-to-date and to keep any number of distributed data sources synchronized. Loads may be divided amongst synchronized data sources such that they remain highly available to end-users. An underlying data management system can be used to reduce the amount of data moved over the network for deployments into a database cloud, a big data cloud, third-party clouds, and so forth. A drag-and-drop user interface can be used to execute reusable Extract, Load, and Transform, (ELT) functions and templates. Real-time test environments can be created to perform reporting and data analytics in the cloud on replicated data sources such that the data can remain highly available to end-users. Data migrations can be executed with zero downtime using duplicated, synchronized data sources. The synchronized data sources can also be used for a seamless disaster recovery that maintains availability.

Figure 1:
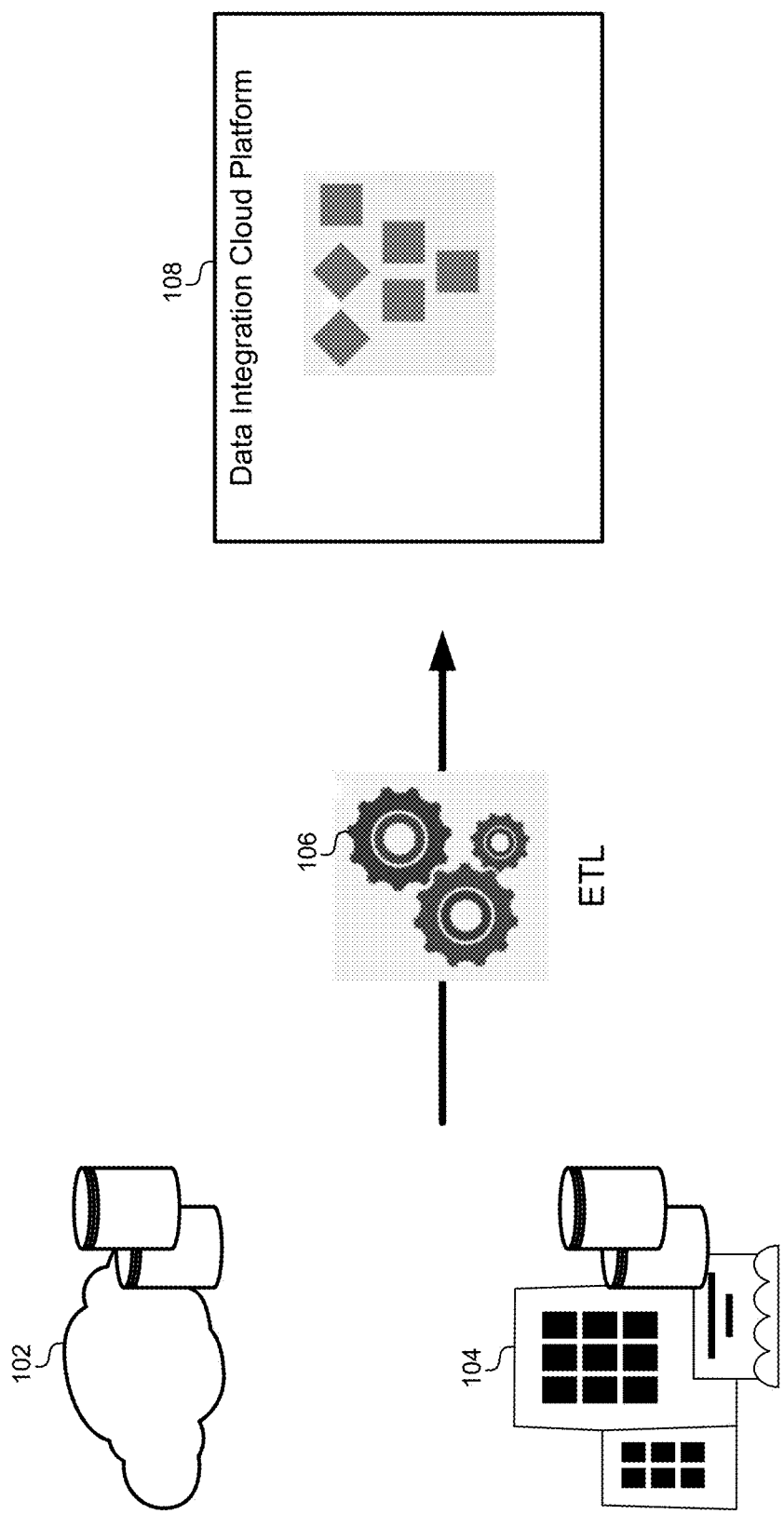
FIG. 1 illustrates a computer system architecture that utilizes the DIC to integrate data from various existing platforms, according to some embodiments.

FIG. 1 illustrates a computer system architecture that utilizes the DIC to integrate data from various existing platforms, according to some embodiments. A first data source 102 may include a cloud-based storage repository. A second data source 104 may include an on-premises data center. In order to provide uniform access and views to the first data source 102 and the second data source 104, the DIC 108 can use an existing library of high-performance ELT functions 106 to copy data from the first data source 102 and the second data source 104. The DIC 108 can also extract, enrich, and transform the data as it is stored in a new cloud platform. The DIC 108 can then provide access to any big data utilities that are resident in or accessible by the cloud platform. In some embodiments, the original data sources 102, 104 may continue to provide access to customers, while replicated data sources in the cloud platform can be used for testing, monitoring, governance, and big data analytics. In some embodiments, data governance may be provided to profile, cleanse, and govern data sources within an existing set of customized dashboards in a user interface.

Figure 2:
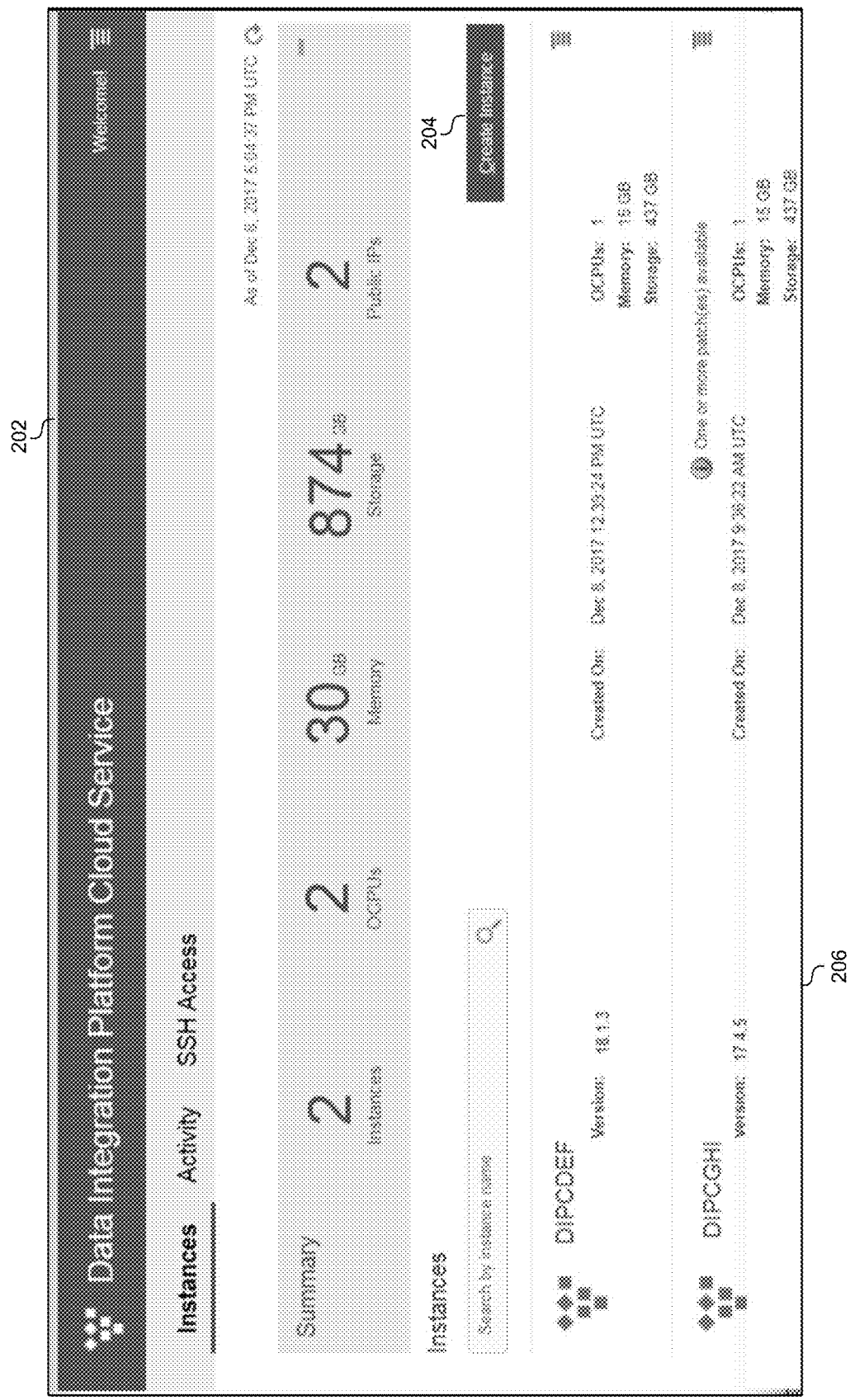
FIG. 2 illustrates one of the customized dashboards in a user interface that can be used to configure, monitor, and control a service instance in the DIC.

FIG. 2 illustrates one of the customized dashboards in a user interface that can be used to configure, monitor, and control a service instance in the DIC 108. A summary dashboard 202 can provide a control 204 that allows users to create a service instance. Next, a series of progressive web forms can be presented to walk the user through the types of information used to create a service instance. In a first step, the user will be asked to provide a service name and description with an email address and a service edition type. The user may also be asked for a cluster size, which specifies a number of virtual machines used in the service. The service edition type determines which applications are installed on the virtual machines. In a second step and corresponding web form, the user may provide a running cloud database deployment to store the schemas of the DIC server. The same database may later be used to store data entities and perform integration tasks. Additionally, a storage cloud may be specified and/or provisioned as a backup utility. The user may also provide credentials that can be used to access the existing data sources used in the data integration. In a third step, the provisioning information can be confirmed and a service instance can be created. The new service instance may then be displayed in the summary area 206 of the summary dashboard 202. From there, the user can access any information for any running data integration service instance.

Figure 3:
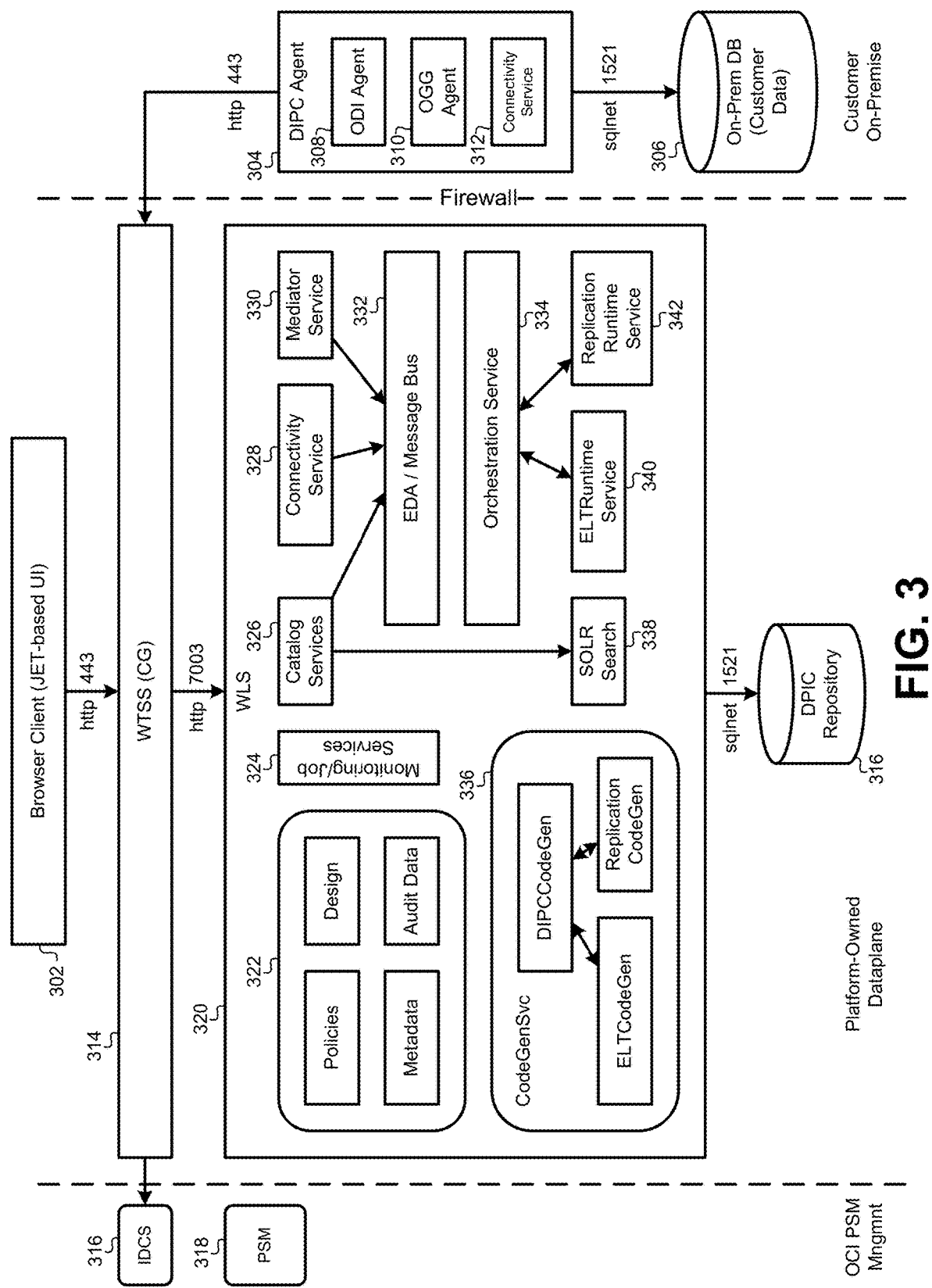
FIG. 3 illustrates an architectural diagram of the DIC, according to some embodiments.

FIG. 3 illustrates an architectural diagram of the DIC, according to some embodiments. Requests may be received through a browser client 302, which may be implemented using a JavaScript Extension Toolkit (JET) set of components. Alternatively or additionally, the system may receive requests through a DIC agent 304 that operates at a customer's on-premises data center 306. The DIC agent 304 may include a data integrator agent 308 and an agent 310 for a replication service, such as Oracle's GoldenGate® service. Each of these agents 308, 310 may retrieve information from the on-premises data center 306 during normal operations and transmit data using a connectivity service 312 back to the DIC.

Incoming requests can be passed through a sign-in service 314, which may include load-balancing or other utilities for routing requests through the DIC. The sign-in service 314 may use an identity management service, such as an identity cloud service 316 to provide security and identity management for the cloud platform as part of an integrated enterprise security fabric. The identity cloud service 316 can manage user identities for both the cloud deployments and the on-premises applications described in this embodiment. In addition to the identity cloud service 316, the DIC may also use a PaaS Service Manager (PSM) tool 318 to provide an interface to manage the lifecycle of the platform service in the cloud deployment. For example, the PSM tool 318 can be used to create and manage instances of the data integration service in the cloud platform.

The DIC can be implemented on a Web logic server 320 for building and deploying enterprise applications in the cloud environment. The DIC may include a local repository 322 that stores data policies, design information, metadata, and audit data for information passing through the DIC. It may also include a monitoring service 324 to populate the local repository 322. A catalog service 326 may include a collection of machine-readable open APIs to provide access to many of the SaaS and PaaS applications in the cloud deployment. The catalog service 326 may also be available for a search application 338 that uses a distributed indexing service, such as the Apache Solr®. A connectivity service 328 and a mediator service 330 can manage connections and provide transformation, validation, and routing logic for information that passes through the DIC. Information within the DIC may be passed using an Event Driven Architecture (EDA) and a corresponding message bus 332.

The DIC may also include an orchestration service 334. The orchestration service 334 may enable automation tasks by calling REST endpoints, scripts, third-party automation frameworks, and so forth. These tasks can then be executed by the orchestration service 334 to provide the DIC functionality. The orchestration service 334 can use run-time services to import, transform, and store data. For example, an ELT runtime service 334 can execute the library of ELT functions described above, while the replication runtime service 342 can copy data from various data sources into a cloud-deployed DIC repository 316. Additionally, the DIC may include a code generation service 336 that provides automatic code generation for both ELT functions and replication functions.

Integration Flow Metadata

In an integration cloud platform, customers are able to create many different types of integration flows to suit their software needs. An integration flow is a chained-together graph of processes that can be used to accomplish a single task. For example, an integration flow may involve combining data from various sources into consolidated data sources. This is often performed in cases where legacy computer systems are being merged or upgraded to a cloud-based system. In other examples, integration flows may be used to chain together any combination of software tools for any purpose. Many of these integration flows that are created within an enterprise may reuse many similar components, may have similar structures, and may use similar objects to perform their functions. The embodiments described herein create a metadata file that can be used for summary, analysis, and machine-learning to generate future flows.

Each integration flow can be analyzed as an overall flow and as individual components within the flow. Properties of the flow and of each component can be parsed and turned into an integration metadata file. This analysis may be designed to ensure that no customer or identifying data is extracted from the flow and placed in the metadata. The process can then parse the integration metadata and extract information that can be used for machine-learning-based suggestion engines for future flow developments. As new users begin designing new flows, it may be overwhelming to identify the appropriate business objects that are most appropriate for source and target systems, to identify the matching service contracts, and so forth. With the machine-learning-based suggestion engine, this process can help users by displaying suggestions based on what other users have done in similar situations. Previous integration metadata files may be used to train a machine learning algorithm that can then be used to generate suggestions for future workflows. For example, when a user has built a portion of a workflow, the machine learning engine can compare the current version of the workflow to previous versions of the workflow and provide suggestions for components and/or connections that can next be added to the workflow. This greatly simplifies the task of generating workflows on an incremental basis. Instead of searching through hundreds of software components that can be added to a workflow, the machine learning engine can provide a greatly simplified list of suggestions that are most likely to be selected by a designer.

Figure 4:
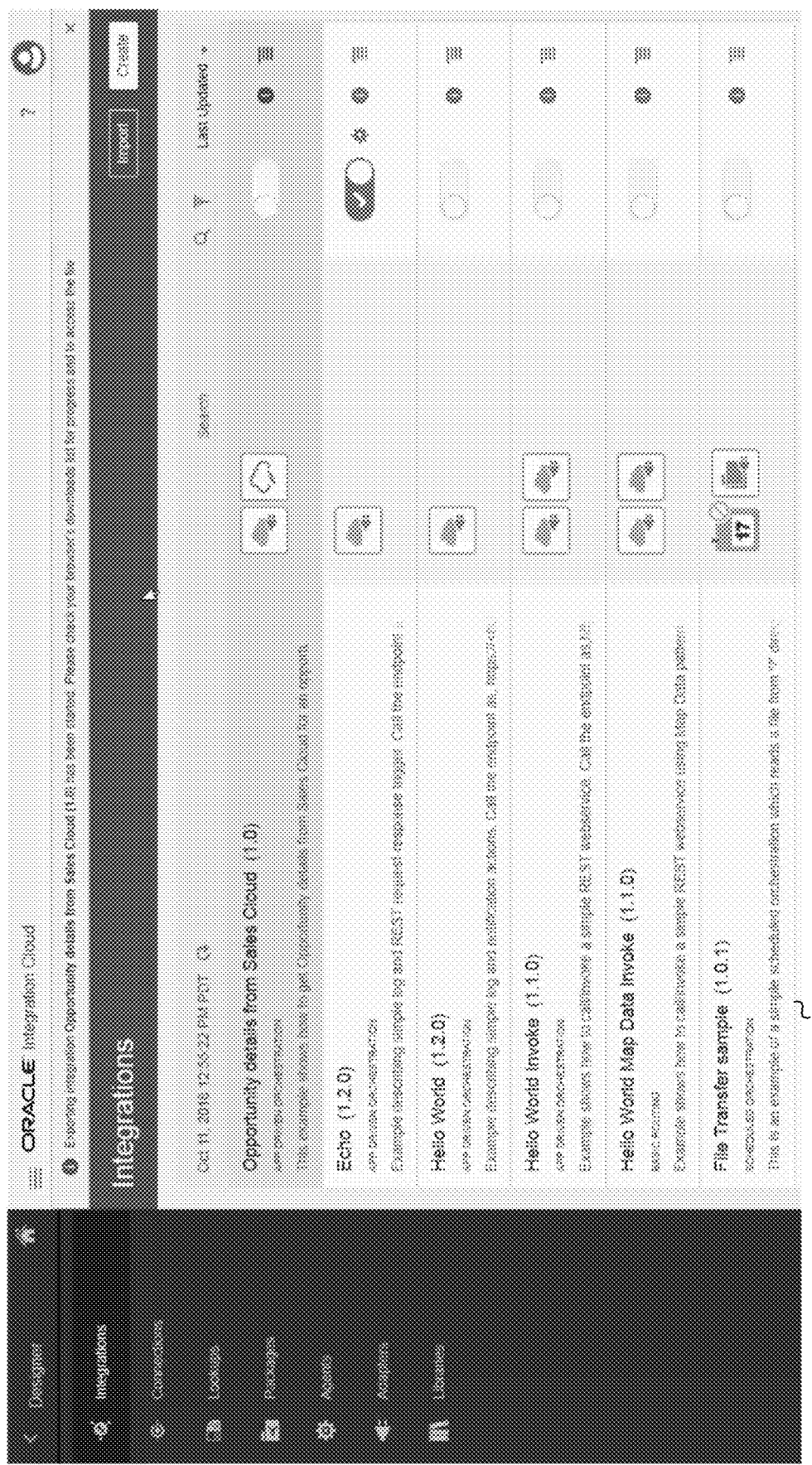
FIG. 4 illustrates an interface for navigating a plurality of integration flows for single customer, according to some embodiments.

FIG. 4 illustrates an interface for navigating a plurality of integration flows for single customer, according to some embodiments. In a large enterprise, customers may have many different integration flows that are under development or use at the same time. This interface allows them to select a single integration flow and examine the details thereof. The interface may include a flow name, and other identifying information to characterize summary details of the integration flow. As customers/users create integration flows in an integration cloud environment, the integration cloud can extract all the relevant metadata of the flow to create the metadata described above.

The interface of FIG. 4 illustrates a dashboard for presenting all of the different integration flows that have been designed as part of a cloud environment in one example. Summary information may be provided for each of the integration flows in the dashboard that may be helpful for quickly assessing the state and/or complexity of an integration flow. As described in greater detail below, a metadata file may be generated that extracts summary information for each of the integration flows. Some of the information from the metadata file may be used as summary information in a dashboard environment.

Figure 5:
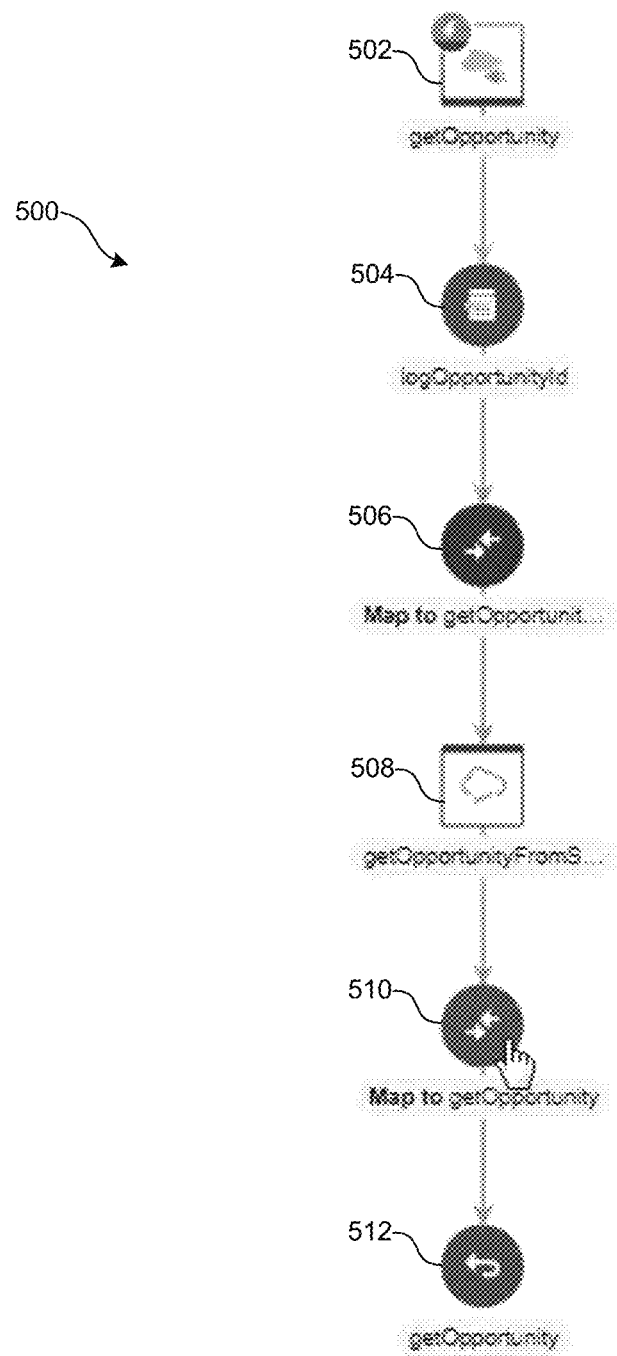
FIG. 5 illustrates a summary view of a single integration flow, according to some embodiments.

FIG. 5 illustrates a summary view of a single integration flow 500, according to some embodiments. This integration flow may have been selected from the summary interface described above in FIG. 4. Each of the components of the integration flows may be displayed in a graphical icon format that allows users to visually arrange and connect different components to build the overall integration flow. This integration flow deals with a cloud sales application, with sales opportunity, sales deals, and sales employees. The integration flow includes a get opportunity REST adapter 502, a log opportunity ID process 504, a mapping component for a cloud sales application 506, a get opportunity from sales application adapter 508, another mapping function to the cloud sales application 510, and a get opportunity process 512. Selecting any of these operations may generate additional information for the specific integration flow components.

One purpose of the integration flow 500 is to retrieve an opportunity from a separate cloud operating environment. In this example, the integration flow 500 retrieves an opportunity object from a Sales Cloud platform. Each of the nodes in the graph represents one software tool that will execute using a set of inputs to generate a set of outputs. Each of the edges and the graph represents a connection between software processes such that the outputs of a previous software process are routed as inputs to a subsequent software process. The integration flow 500 operates by sequentially executing software tools (e.g., nodes in the graph) using the dependencies defined by the edges and the graph.

When building the integration flow 500, users may be presented with a list of available software tools that may be used in the integration flow 500. Generally, a very large number of software tools may be available at any stage in the integration flow 500. In the example of FIG. 5, the integration flow 500 is used to query the Sales Cloud platform, and this platform may include hundreds of software components that may be used in an integration flow. Therefore, when adding the get opportunity process 512, the user may be presented with over 100 software components to which the get opportunity process 512 may be connected. However, an experienced user having built many integration flows similar to the integration flow 500 may realize that the get opportunity process 512 should be selected after the mapping function to the cloud sales application 510, even though the interface for selecting the get opportunity process 512 conveyed no such information.

The embodiments described herein solve this and other technical problems by using previous integration flows to suggest components and connections that may be added to a portion of an integration flow as it is being generated. Instead of being required to navigate hundreds of available software components, the system may instead select one or more preferred software components that may be provided as suggestions to the user. This allows the user to select from a relatively small number of software components that have been used in similar situations by previous users. This information may be provided by a machine learning engine that uses metadata files extracted from previous integration flows to provide such suggestions. The following figures and description describe the process for extracting a metadata file from the integration flow and using the metadata file to provide summary information for the integration flow and to train the machine learning engine for providing future suggestions.

FIG. 6 illustrates a portion of a metadata file 600 extracted from the integration flow of FIG. 5, according to some embodiments. This portion of the metadata file 600 illustrates information that is gleaned from the overall integration flow project. To generate this metadata file 600, the integration system may identify each of the files that are generated to describe and store a completed integration flow. In some implementations, this may be a single file that describes the integration flow, while in other implementations many different files and/or directories may be used to describe an integration flow as it is stored. The integration system may parse each of these files to identify portions of the text describing the integration flow that are useful in generating a specific metadata file 600 that includes summary information and information used to train a machine learning process as described below.

The metadata file 600 may first parse the integration flow files to identify information describing the state of the integration flow. This includes information such as a version 608 and a percent completion 610. It also includes information that describes the graphic model used to illustrate the integration flow 612, such as a model type (e.g., free form) and a project code 614. This information can be extracted from project information provided by the user and generated automatically as the integration software stores the files representing the integration flow.

Each metadata file may also include a processor count 602. The system may analyze each component in the integration flow and assign a type to that component. The processor count 602 can aggregate all of the different component types used in the integration flow. In this example, the integration flow controls one message tracker, two data transformers, one activity stream logger, one data source, and one data target. As described below, the processor count 602 can be used to generate summary information for a single integration flow or a group of integration flows. This information can be extracted from the definition files for the integration flow where each processor type is defined. Generally, a "processor" in an integration flow may be any software component that processes information, such as the nodes represented in the integration flow 500 of FIG. 5.

Each metadata file may also include one or more smart tags 604. The smart tags 604 can be used to characterize different aspects of the integration flow. Smart tags may be single values, or may be colon-separated values that add a scope to tag identifiers to the right of the colon. In this example, the integration flow includes two components or combinations of components that may be characterized as "adapters." One adapter may be a REST interface adapter, while the other adapter may be a sales cloud application adapter. The smart tags may be represented as "adapter:rest" and "adapter:osc." These tags indicate that both tags involve adapters, and the scope operator indicates that a specific type of adapter is specified by each tag (e.g., rest, Sales Cloud, etc.). Smart tags may be manually assigned by a user when instantiating or importing the components into the integration flow. Alternatively, the method described herein may automatically generate and assign smart tags to integration flows. For example, the process may analyze a type for each component or collection of components and derive a smart tag that describes their functionality. The smart tag can then be automatically aggregated in the metadata file as shown in FIG. 6.

FIG. 7 illustrates a continuation of the metadata file from FIG. 6, according to some embodiments. The metadata file may also include an orchestration section 700 for each integration flow. The orchestration section 700 describes activities and components that are part of the integration flow. In this listing, different types of components that are part of the integration flow are listed specifically in the orchestration section 700. The orchestration section 700 for each component includes additional information that can be used for both summary information and for machine learning activities. In this example, the orchestration section 700 includes a listing of a number of different components having different types, such as receive components, logger components, transformer components, invoke components, and so forth. Each component may list an application that uses the component, a business object within the application that is used by the component, and a specific operation performed in the application on the business object. By way of example, a component 702 is included that is of the INVOKE type. The component 702 uses the sales cloud application ("osc"), a specific object 704, and a specific operation 706 to be performed on that object. As with the other metadata, this information can be automatically gleaned from the project definition file for the integration flow.

In this example, the INVOKE component 702 lists a specific object 704 that is used in execution. This information may be extracted and included in the metadata file because it may be helpful for providing suggestions in future similar integration flows. For example, just as the different components available may be overwhelming to some users, different objects that may be operated on by these components may also be very large. When this particular component is selected in the future, the machine learning engine may use the metadata files from previous similar integration flows to suggest one or more preferred objects, such as object 704 that have been used before. This operates on the assumption that objects used in the past are likely to be used again in the future in similar integration flows.

In this example, the INVOKE component 702 also lists a specific operation 706 performed on the object 704. In this example, the OpportunityService object 704 serves as an argument to the getOpportunity operation 706 in the osc application. As was the case for the specific object 704, future integration flow designers may wish to reuse the same operations for this component. Therefore, this information may be extracted from the flow definition files and included in the metadata file to provide an indication of operations that were previously used by flow designers for similar integration flows. This information can be used to suggest operations for users in future integration flows.

As covered in greater detail below, the metadata file that is generated by from the definition files for an integration flow can be used for a number of different purposes. In some embodiments, the metadata file may be used to generate summary information for a specific integration flow. For example, as a user designs an integration flow, it may be useful to see the number of different processes and the types of processes being used by the integration flow. After the integration flow is complete, it may also be useful for generating summary information that may be displayed in the dashboard illustrated in FIG. 4.

Figure 8:
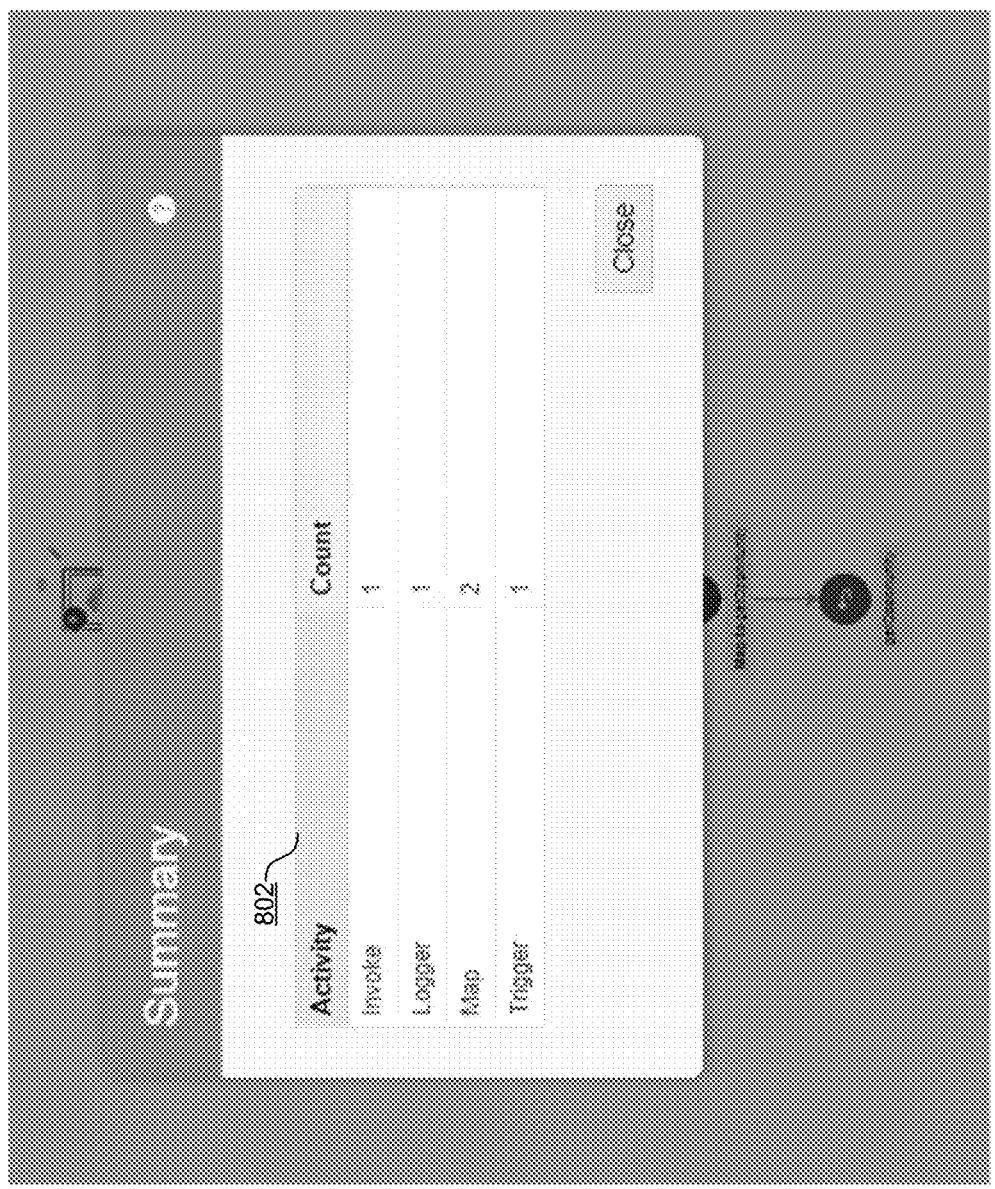
FIG. 8 illustrates a summary window based on metadata derived from the integration flow, according to some embodiments.

FIG. 8 illustrates a summary window based on metadata derived from the integration flow, according to some embodiments. The summary window 802 can extract the processor count from a current project and display the types of components used within that integration flow. In this example, a relatively simple flow may be characterized by a single invoke, logger, and trigger components, along with two mapping components. This can a provide a valuable summary of the overall complexity of the integration flow. It can also characterize integration by emphasizing components that are under- and over-represented. For example, an integration flow that includes a large number of mapping operations may characterize the overall flow in one way is as a data transformation process, while an integration flow that includes a large number of logging operations may characterize the overall integration flow in another way as, for example, a data extraction process.

Although the summary information is displayed for a single integration flow in FIG. 8, this is presented merely by way of example and not meant to be limiting. Typical integration flows may include hundreds of individual processes and components. Additionally, some embodiments may provide summary information for a collection of integration flows that have been designed by a particular customer. This can provide summary information describing how the data integration platform cloud is handling overall integration activities. This may also provide information as to the type of data being integrated by the platform, the applications used to transform the data, the source databases that are most heavily accessed, and so forth. All this information can be extracted and derived from the metadata files for the individual projects.

Some embodiments may also include an equation that characterizes the overall complexity of the project using the processor count displayed in the summary information. This equation can take into account the number of each component, and combine them in a weighted linear combination to generate a complexity score. This can be generated for each integration flow in a customer account, and they can be displayed together for comparison. This information can be summarized and displayed in the dashboard of FIG. 4.

Figure 9:
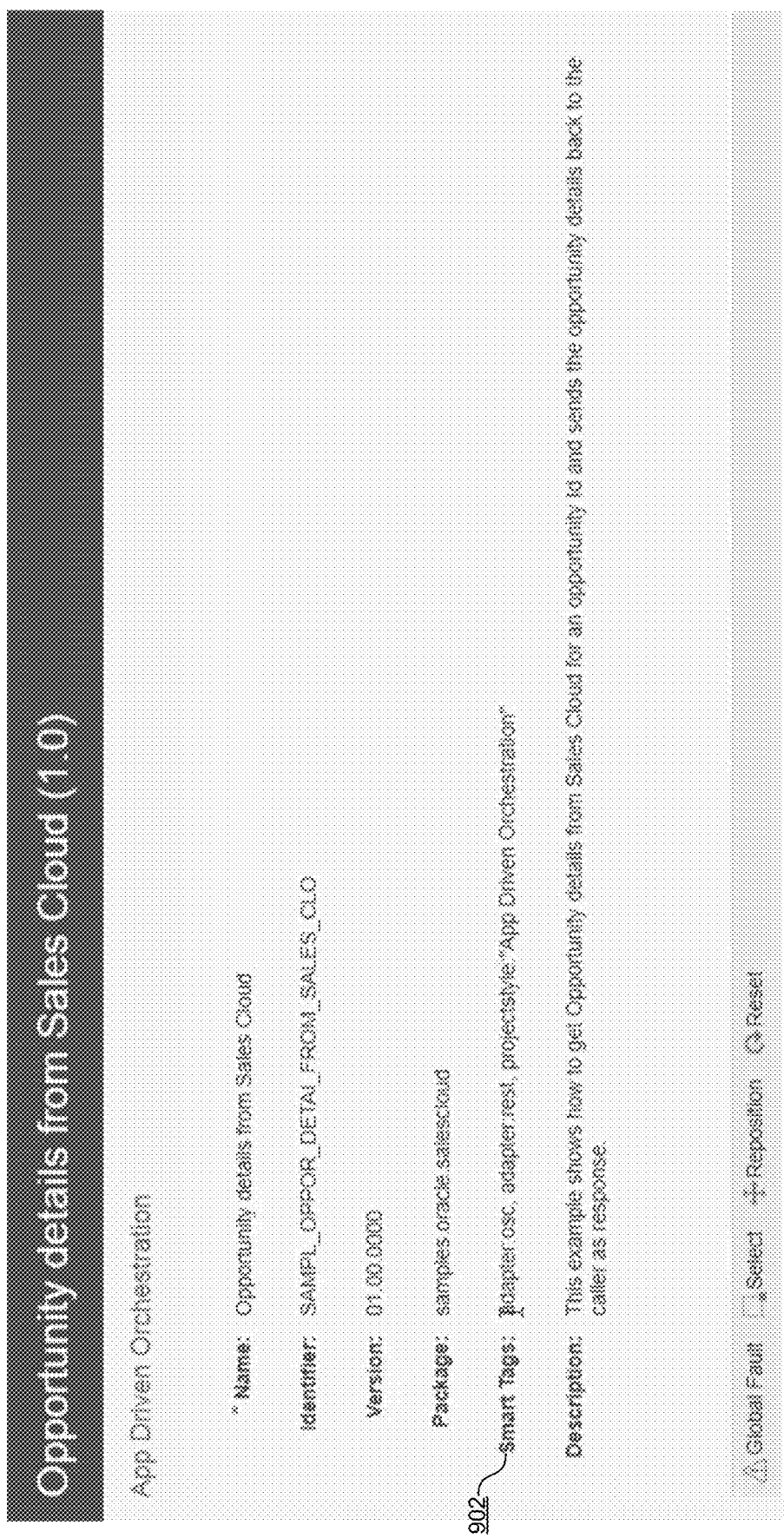
FIG. 9 illustrates a display of smart tags for an integration flow, according to some embodiments.

FIG. 9 illustrates a display of smart tags for an integration flow, according to some embodiments. The smart tags 902 for the integration flow can again provide a summary of the types of processes and components in the integration flow. Smart tags can be used to characterize certain operations and/or components used in an integration flow. By displaying the smart tags with a description and other summary information for the user of the specific integration flow, the user may quickly see the types of operations that are performed by integration flow.

Additionally, the user can use the smart tags to search a library of integration flows for other integration flows that use the smart tags. For example, the user can select the adapter:osc tag to search for other integration flows that use this same tag. This can allow the user to examine other integration flows to see how they operate, what components they use, and how to build the integration flow in a similar manner. In addition to using smart tags for a single integration flow, these methods may also provide smart tag utilities that can be used on the library of integration flows for the customer. For example, the customer may view statistics shown in FIG. 9 for a library of integration flows.

In addition to providing summary and statistical information, the metadata described herein can also be used in conjunction with a machine learning engine to provide suggestions for building future integration flows. In some embodiments, the library of integration flows can provide their associated metadata files to the machine learning engine, and the machine learning engine can identify patterns and similarities in each of the integration flows. This can be used to generate a recommended "next step" in future integration flows as they are developed. For example, if the user inserts the "getOpportunity" component illustrated in FIG. 5, the cloud platform can automatically provide a suggestion indicating that the next component most likely to be added to the integration flow would be the "logOpportunityId" component illustrated in FIG. 5. The system may also suggest a plurality of suggested components ranked in order of previous usage as identified by the machine learning engine.

In another example, the machine learning engine can also identify specific business objects that can be used when a particular component is instantiated in the integration flow. A single component related to, for example, the sales cloud application may include hundreds of different business objects that may be associated with the component. The machine learning engine can identify common business objects used within the sales cloud application and suggest these to the user when they use a sales cloud component in an integration flow. Users often know the component they wish to use but do not know the exact object to select in the associated application. This allows the selection process to be narrowed from hundreds of objects to a handful of ranked objects from which the user may select.

In another example, the machine learning engine can also identify operations that are performed on specific business objects. Just as the application may have hundreds of different business objects, hundreds of different operations may be executed on each business object. The machine learning engine can identify patterns in the metadata in previous usages of particular business objects and determine the operations most likely to be related to those business objects. When the user selects a business object for use in a component in an integration flow, the system can provide a ranked list of suggested operations to be performed using that business object in the integration flow. Again, this narrows the selection process and dramatically improves the information presented to the user in a more efficient manner.

In another example, the machine learning engine can recommend target systems based on the selected source system. When integrating data from a source system to a target system, the user will typically select a source system at the beginning of the integration flow. Based on the selection, the machine learning engine can analyze the metadata of previous integration flows and determine a ranked list of target systems that are most likely to be connected to the source system. This can prevent user error in selecting an incorrect target system and initiating and erroneous data integration flow.

In another example, the machine learning engine can make other suggestions when analyzing a selected source in an integration flow. For example, the machine learning engine can recognize a particular source system selected in an integration flow and analyze the metadata of previous integration flows that also began with the same source system. The machine learning engine can then present a ranked list of business objects used when a particular database is the source of an integration flow.

FIG. 10A illustrates a portion of a metadata file derived from one or more definition files for an integration flow, according to some embodiments. This metadata file may include more than just text that is extracted from definition files. Typically, definition files for an integration flow may be complex, may include multiple files of different types, and may include compiled code (.jar files, etc.). The metadata file extracts information from the definition files and compiles it into a structured format, such as the JSON format illustrated in FIG. 10A. Although the metadata file may include many different types of information, including the processor count and summary information described above, this section focuses on a portion of the metadata file describing source-target relationships between processors in the integration flow.

A source-target relationship in the metadata file may be indicated using the "Invoke" tag, indicating that one system is invoking another system. The Invoke object may include multiple sub-objects, the first of which is illustrated in FIG. 10A. Each sub-object may include a "role" 1002 indicating whether the object is a target or a source. Each sub-object may also include an adapter 1004 that describes an adapter used for a particular application in the cloud environment in which the source/target object operates. In this example, the "osc" (Sales Cloud) adapter may be used. Additionally, the object may include an operation that describes an operation performed by the object. In this example, the operation includes many sub-fields that specify specifics of the operation. This information may include operation attributes, messages, names, resource paths, and so forth.

FIG. 10B illustrates a second portion of the metadata file specifying the target half of a source-target relationship, according to some embodiments. This portion of the metadata file may continue where the metadata file in FIG. 10A left off. This second sub-object in the Invoke object structure defines the target object in the source-target relationship. The role 1010 may be specified as a target, and the adapter 1012 may again be specific to a particular application in the cloud environment. Details for the corresponding operation 1014 may also be listed, along with messages, resource paths, names, and so forth.

This metadata file may include many different Invoke objects in addition to the object illustrated in these figures. The combination of these objects may describe the integration flow and how each of the processes are connected to each other. Also note that the operations 1006, 1014 include a number of objects that the source/target objects operate upon.

Figure 11:
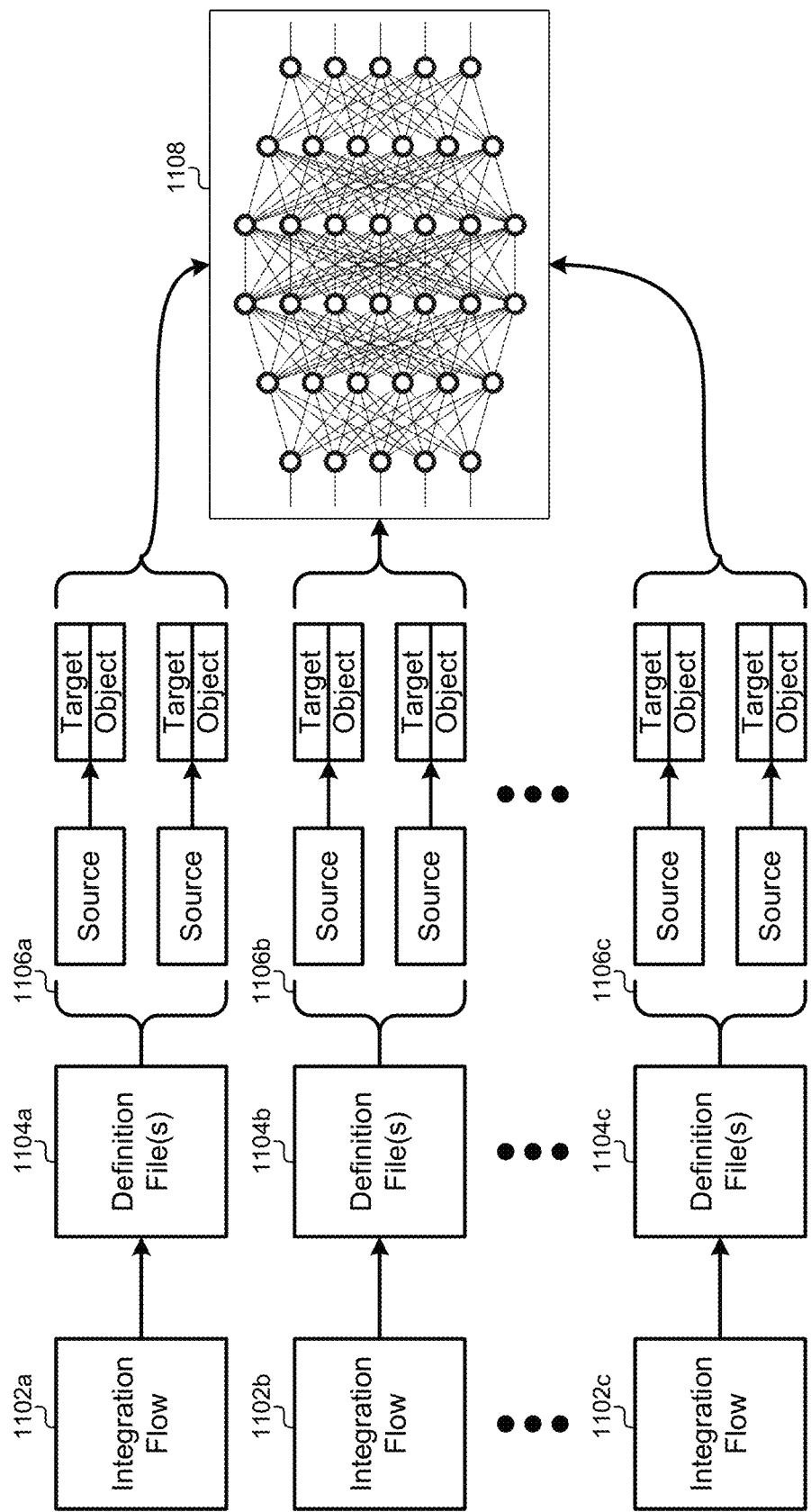
FIG. 11 illustrates a machine-learning process that may be used to train a model for generating recommendations when defining future integration flows, according to some embodiments.

FIG. 11 illustrates a machine-learning process that may be used to train a model 1108 for generating recommendations when defining future integration flows, according to some embodiments. In a cloud environment, the cloud provider may have access to the integration flows for hundreds of different customers. However, integration flows may include proprietary or otherwise private data that the customer likely does not want to share with the cloud provider. Therefore, the methods described herein for extracting information from the definition files to create an agnostic metadata file may be used to protect the privacy and data security of individual customers while still providing a large training data set for the cloud provider. For example, in each of the metadata file examples described and depicted above, any identifying or private information that would be sensitive for a customer has been excluded from the metadata file. This allows the cloud provider to use information derived from integration flows without compromising customer privacy.

A plurality of integration flows 1102 may be designed by individual customers using the cloud environment. The integration flow software may save and define the integration flows 1102 using one or more definition files 1104. As the integration flow software receives the definition files 1104, the integration flow software in the cloud environment can analyze each of the definition files to generate a plurality of metadata files 1106 as described above. The metadata files may include summary information, and the summary information may include a plurality of source-target relationships between objects or processes in the integration flows. The source-target relationships may include objects that are operated on by the source and/or target.

A model 1108 may be trained using these source-target relationships as inputs. For example, the source objects may be provided to a neural network that can be trained to output corresponding targets and/or objects for particular source inputs. In addition to the source inputs, the system may also provide additional inputs in the form of one or more characteristics of a particular integration flow. These characteristics may include objects in the integration flow prior to the source object, applications referenced by the integration flow (e.g., sales cloud, particular databases, etc.) a particular customer/tenant generating the integration flow, other data objects in the integration flow, a particular user generating integration flow, and/or any other characteristic of the integration flow itself.

As the model 1108 is trained, it can be configured to provide many different types of outputs related to the inputs. In some embodiments, multiple models may be trained to provide different output types. These different outputs of the model 1108 are described in greater detail below. These custom models can be used to generate personalized recommendations for future integration flows. For example, models may be trained that are specific to customers, specific to individual users, specific to applications, specific to business sectors, specific to geographic locations, and so forth. For example, a model may be trained using all customers that interface with a sales cloud application. A separate model may be trained using all users for a particular customer, so forth.

Figure 12:
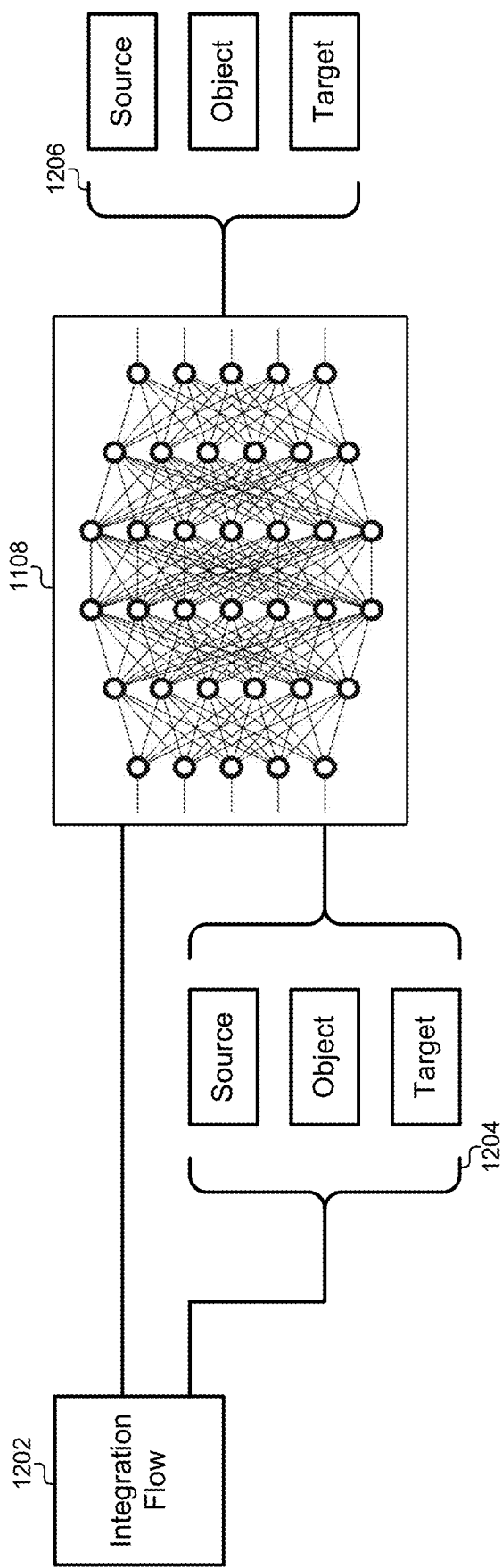
FIG. 12 illustrates how a model may be used to provide recommendations for a current integration flow under development, according to some embodiments.

FIG. 12 illustrates how a model may be used to provide recommendations for a current integration flow 1202 under development, according to some embodiments. The integration flow and/or the user may select one or more objects 1204 from the integration flow 1202 to be provided to the model 1100 made. These objects 1204 may include source processes, target processes, and/or objects that are operated on by the source/target objects. These may be provided as inputs to the model 1108. In some embodiments, the particular objects 1204 may be used to select a model from a plurality of trained models. For example, if a source is provided, a first model may be used that is trained on previous source inputs. If a target is provided, a second model may be used that is trained on previous target inputs. Each of these models may provide a plurality of outputs and/or recommendations that may be used in the integration flow 1202.

In some embodiments, additional inputs may optionally be provided by the integration flow 1202. These inputs may include characteristics of the current integration flow, including any of the characteristics described above, such as a customer identifier, a user identifier, an application, a cloud environment, geographic location, a number of times the tool has been used by the particular user, and/or any other characteristic. These may be provided as an input along with the source/target/object to the model 1108 to generate a recommendation.

The model 1108 may run the inputs through a neural network to generate outputs that have been trained by the previous integration flow data sets described above. The output of the neural network may be dependent on the type of model. As described above, different models may be used to generate different output types. In the example of FIG. 12, the model 1108 may generate source, object, and/or target outputs 1206 that may be used as a suggestion for a next step in the current integration flow. In some embodiments described below, a plurality of sources, objects, and/or targets may be provided instead of just a single one. These may be provided as a list of recommendations that are ordered based on a likelihood that users will select them. For example, when providing a source as an input to the model 1108, the model 1108 may generate an ordered list of the five most likely targets to follow the input source based on previous integration flows. In another example, when providing an object as an input to the model 1108, the model 1108 may output a list of likely targets that may be used to process the input object. These suggestions and/or lists may be provided in a user interface, and one of the suggestions in the list may be selected by the user to be automatically incorporated into the integration flow designed by the user interface.

Figure 13:
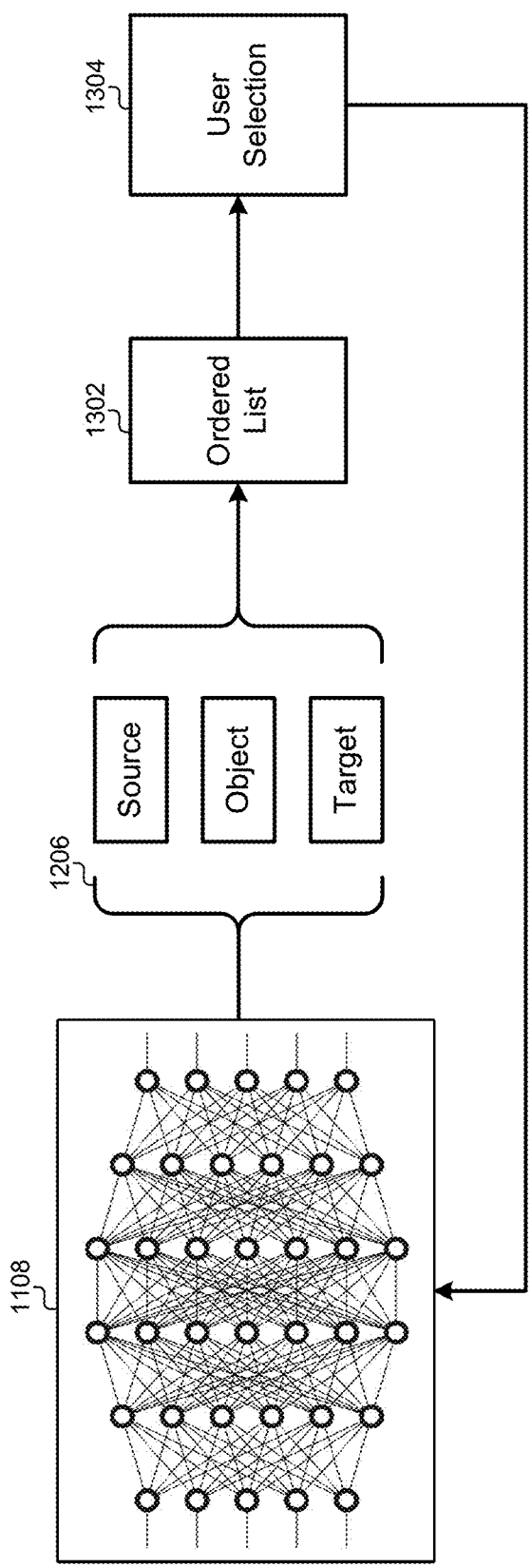
FIG. 13 illustrates a process for continually training the model using selections from a list of recommendations, according to some embodiments.

FIG. 13 illustrates a process for continually training the model 1108 using selections from a list of recommendations, according to some embodiments. As described above, the model 1108 can generate more than just a single suggestion. Some embodiments may generate an ordered list of suggestions that provides multiple options from which a user may choose. This selection by the user may be made through a graphical user interface (GUI). Once the selection is received, this selection may be used to further train the model 1108 to refine the way in which recommendations are given to future integration flows.

The ordered list 1302 may be presented to the user, and the user selection 1304 may include selecting one or more of the options from the ordered list 1302. The user selection 1304 may be instantiated in the GUI such that it becomes part of the current integration flow. Additionally, the user selection 1304 may be routed back to a training process for further refining the model 1108. For example, if the system provides an ordered list of objects for a selected target process, and the user selects the third object in the ordered list, this information may be provided to the machine-learning-training process to refine the model 1108 such that the user selection 1304 of the third object in the list moves up the ordered list in precedence.

Figure 14:
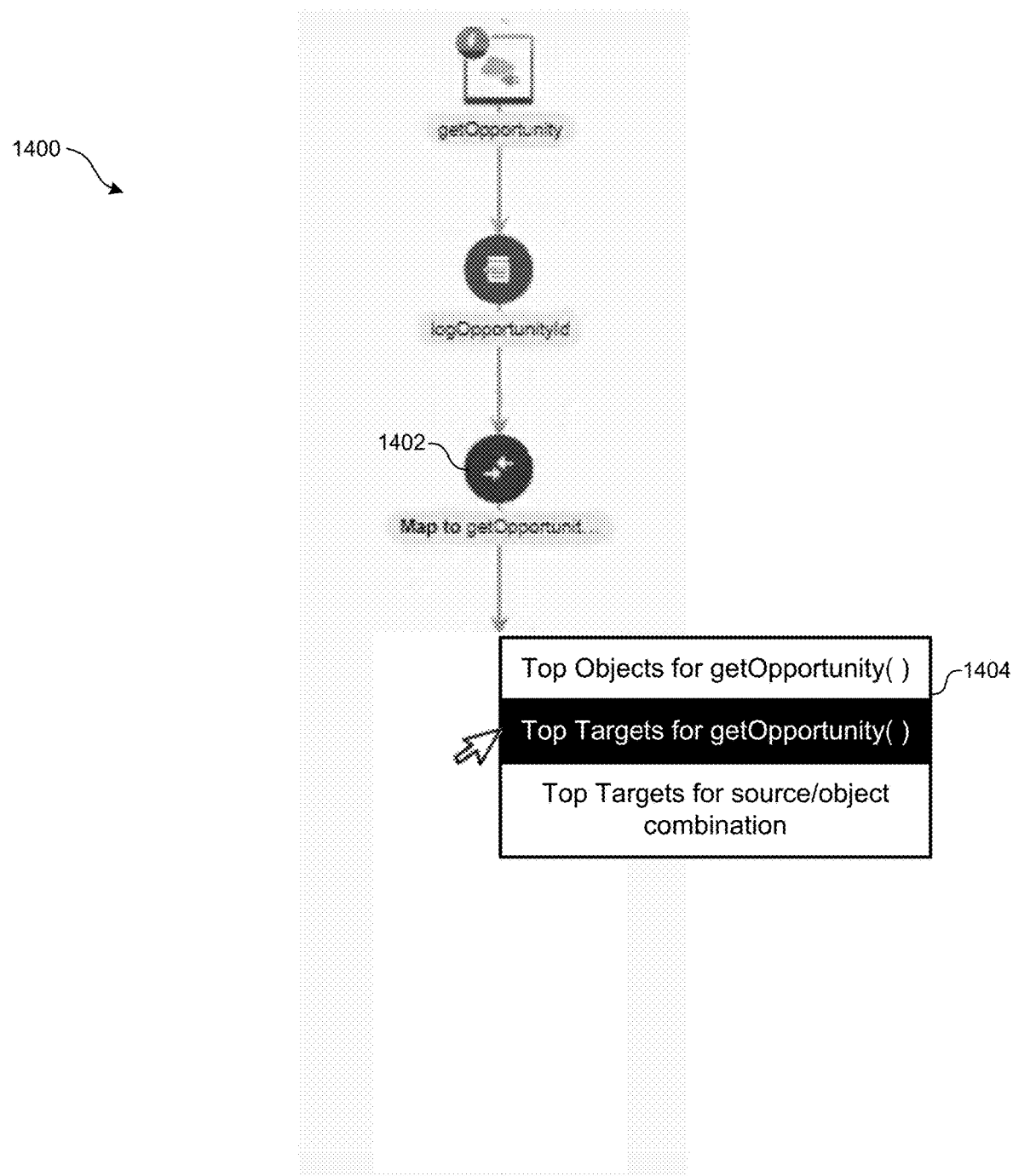
FIG. 14 illustrates an example of a user interface for requesting recommendations in an integration flow, according to some embodiments.

FIG. 14 illustrates an example of a user interface for requesting recommendations in an integration flow, according to some embodiments. In this example, the user may have assembled a portion of an integration flow that is currently under development. After the mapping process for the "getOpportunity" process, the user may provide an input that requests one or more recommendations (e.g., a right-click). Alternatively, the interface for the integration flow software may automatically provide a list of recommendations.

In this example, the interface may provide three different available recommendation categories that may be processed by the system. These recommendations may include displaying the most likely objects to be used in association with the getOpportunity process 1402, the most likely targets to be used in association with the getOpportunity process 1402, and/or the most likely targets to be used with the getOpportunity process 1402 and a selected object in combination. The user may select one of these categories to generate the corresponding list of recommendations. Each of the categories in the list 1404 illustrated in FIG. 14 may be associated with a different model that has been trained as described above. For example, the category for selecting the most likely targets to be used in association with a suggested source may take the source and (optionally) one or more characteristics of the integration flow to generate a ranked list of targets. Similar types of models may have been trained for each recommended category.

These three categories of recommendations are provided only by way of example and are not meant to be limiting. Other embodiments may train other models to provide different types of recommendations. For example, some embodiments may retrieve example integration flows that use particular adapter types. Some embodiments may request a list of likely adapters or mappers to be used. Some embodiments may request likely objects to be used with a particular application, and so forth. Depending on the embodiment, a model may be trained to make any recommendation of any category of selections that may be useful to a user when designing an integration flow.

Figure 15:
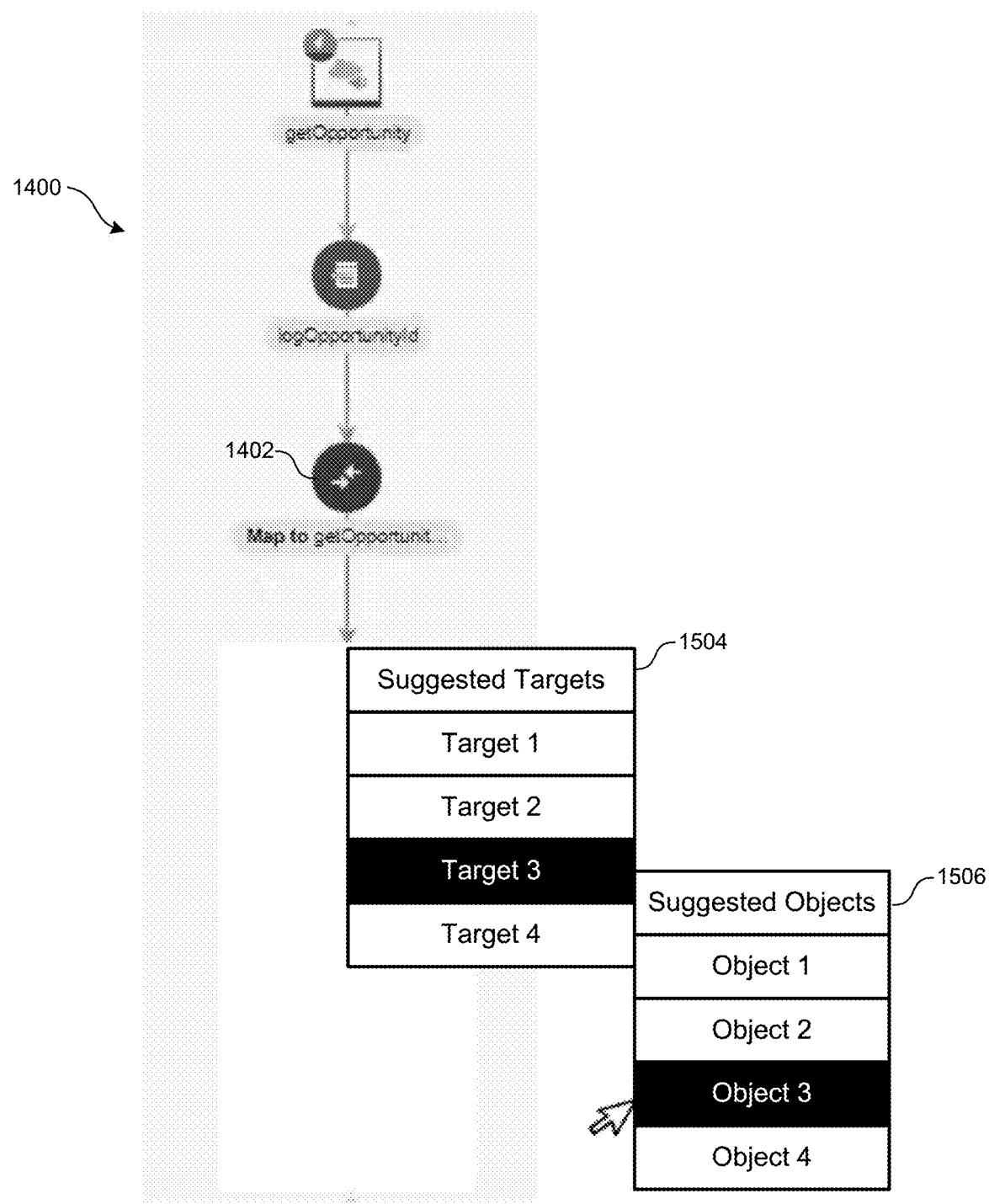
FIG. 15 illustrates an example of an ordered list of recommendations provided for an integration flow, according to some embodiments.

FIG. 15 illustrates an example of an ordered list of recommendations provided for an integration flow, according to some embodiments. This example may continue from FIG. 14. For example, the user may have selected the option to receive the top targets for the getOpportunity process 1402. Alternatively, the interface may provide the list of suggested targets 1504 automatically without requiring a user selection. As described above, the system may provide a source and/or one or more characteristics of the integration flow to the model to provide an output comprising an ordered list of suggested targets 1504. When the user selects one of the targets in the list of suggested targets 1504, the interface can automatically instantiate the selected target as part of the integration flow 1400. This may be represented graphically by adding an icon to the integration flow 1400 in the interface.

Some embodiments may provide additional functionality when selecting a suggested option from a ordered list of recommendations. For example, when selecting a target from the ordered list of suggested targets 1504, the interface may provide an additional list of suggested objects 1506 that may be used or processed by the selected target from the list 1504. Selecting a target from the suggested list of targets 1504 may trigger a seconds execution of one of the trained models. In this example, the selected target, the existing source, and/or characteristics of the integration flow may be provided to a data model trained to provide an ordered list of suggested objects that may be processed by the target. The outputs from that model may include an ordered list of suggested objects 1506, which may be presented to the as a follow-on, drop-down menu of recommendations. In some embodiments, each selection from a recommended list of suggested objects/targets may generate additional lists when previous selections are provided to a model. In this example, selecting the object from the list 1506 may generate an additional drop-down menu of recommendations related to the selected object.

Figure 16:
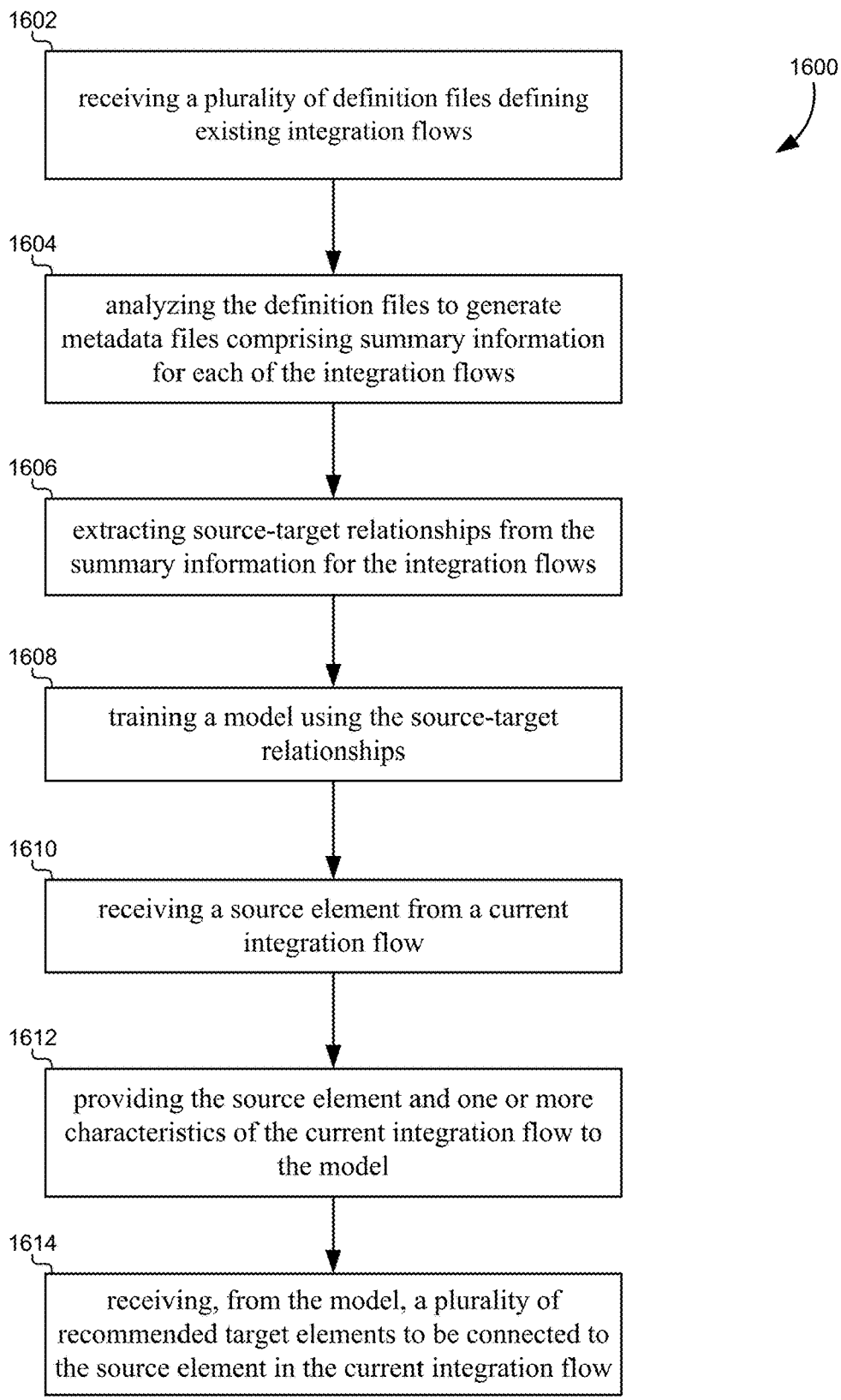
FIG. 16 illustrates a flowchart of a method of generating and using metadata files for completing integration flows, according to some embodiments.

FIG. 16 illustrates a flowchart 1600 of a method of generating and using metadata files for completing integration flows, according to some embodiments. The method may include receiving a plurality of definition files defining a plurality of existing integration flows (1602). The method may also include analyzing the definition files to generate a plurality of metadata files (1604). The metadata files may include summary information for each of the plurality of integration flows. The method may additionally include extracting a plurality of source-target relationships from the summary information for each of the plurality of integration flows (1606). The method may further include training a model using the plurality of source-target relationships (1608). These steps may be performed using any of the details above describing the generation of metadata files and the training of models.

After the model has been trained, the method may also include receiving a source element from a current integration flow (1610). The source element may be provided to a model, along with one or more characteristics of the integration flow (1612). The method may further include receiving, from the model, a plurality of recommended target elements to be connected to the source element in the current integration flow (1614). This process for using a trained model to generate a recommendation of targets may include any of the details described above. In some embodiments, this portion of the method may also optionally include providing other types of inputs (e.g., targets) and receiving different outputs (e.g., objects) from the model.

It should be appreciated that the specific steps illustrated in FIG. 16 provide particular methods of generating and using a metadata files for an integration flow according to various embodiments of the present invention. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

The following listing is a sample metadata file extracted from an actual integration flow.

```
{
"icProject": {
  "processSummary": [
    {
      "count": 0,
      "ActivityType": "assignment"
    },
    {
      "count": 0,
      "ActivityType": "scheduleReceive"
    },
    {
      "count": 0,
      "ActivityType": "while"
    },
    {
      "count": 1,
      "ActivityType": "transformer"
    },
    {
      "count": 0,
      "ActivityType": "for"
    },
    {
      "count": 0,
      "ActivityType": "contentBasedRouter"
    },
    {
      "count": 0,
      "ActivityType": "notification"
    },
    {
      "count": 1,
      "ActivityType": "messageTracker"
    },
    {
      "count": 0,
      "ActivityType": "catchAll"
    },
    {
      "count": 2,
      "ActivityType": "Invoke/Trigger"
    }
  ],
  "Transformer": {
    "OutputMsg": {
      "RootElement": "Create",
      "messageContextRef": "messagecontext_15",
      "RootElementNS":
"http://xmlns.oracle.com/cloud/adapter/rightnow/CreateOrganization_REQUEST/types"
    },
    "role": "transformer:request-map",
    "xsltFileLoc":
"../resources/processor_27/resourcegroup_30/req_d0a1268abdc84c2ca038bda15342379a.xsl",
    "InputMsg": {
```

```
            "RootElement": "process",
            "messageContextRef": "messagecontext_7",
            "RootElementNS":
"http://xmlns.oracle.com/cloud/adapter/osc/
AccountUpdate_GG_REQUEST/types"
          }
        },
        "keywords": "osc rightnow",
        "Version": "01.02.0000",
        "percentageComplete": 100,
        "ModelType": "template",
        "Code": "OSC_TO_ORN",
        "doc_id": "OSC_TO_ORN01.02.0000",
        "Invoke": [
          {
            "role": "source",
            "mep": "fire-and-forget",
            "adapterName": "osc",
            "Operation": {
              "JCAProperty": [
                {"generatePartnerLink": false},
                {"endpointWSDLURL":
                  "AccountUpdate_GG_ENDPOINT.wsdl"},
                {"targetOperation": "process"},
                {"applicationVersion": 1}
              ],
              "Message": {
                "RootElement": "process",
                "messageContextRef": "messagecontext_7",
                "RootElementNS":
"http://xmlns.oracle.com/cloud/adapter/osc/
AccountUpdate_GG_REQUEST/types",
                "direction": "output"
              },
              "OperationName": "process",
              "Resource": {"Path":
"../resources/application_1/outbound_2/
resourcegroup_3/AccountUpdate_GG_REQUEST.jca"},
                "JCAFilePath":
"../resources/application_1/outbound_2/
resourcegroup_3/AccountUpdate_GG_REQUEST.jca",
                "direction": "outbound"
              },
              "adapterType": "app-adapter"
            },
            {
              "role": "target",
              "mep": "push-sync",
              "adapterName": "rightnow",
              "Operation": {
                "JCAProperty": [
                  {"generatePartnerLink": false},
                  {"noSchemaSupportEnabled": true},
                  {"selectedPrimaryObjects": "[Organization]"},
                  {"operationPath": "Create"},
                  {"targetOperation": "Create"},
                  {"applicationVersion": "1_3"},
                  {"generateInboundCredentials": true}
                ],
                "Message": [
                  {
                    "RootElement": "Create",
                    "messageContextRef": "messagecontext_15",
                    "RootElementNS":
"http://xmlns.oracle.com/cloud/adapter/rightnow/
CreateOrganization_REQUEST/types",
                    "direction": "input"
                  },
                  {
                    "RootElement": "CreateResponse",
                    "messageContextRef": "messagecontext_17",
                    "RootElementNS":
"http://xmlns.oracle.com/cloud/adapter/rightnow/
CreateOrganization_REQUEST/types",
                    "direction": "output"
                  },
                  {
                    "RootElement": "RequestErrorFault",
                    "messageContextRef": "messagecontext_19",
                    "RootElementNS": "urn:faults.ws.rightnow.com/v1_3",
                    "direction": "output"
                  },
                  {
                    "RootElement": "UnexpectedErrorFault",
                    "messageContextRef": "messagecontext_21",
                    "RootElementNS": "urn:faults.ws.rightnow.com/v1_3",
                    "direction": "output"
                  },
                  {
                    "RootElement": "ServerErrorFault",
                    "messageContextRef": "messagecontext_23",
                    "RootElementNS": "urn:faults.ws.rightnow.com/v1_3",
                    "direction": "output"
                  },
                  {
                    "RootElement": "RequestErrorFaultDetail",
                    "messageContextRef": "messagecontext_25",
                    "RootElementNS": "urn:faults.ws.rightnow.com/v1_3",
                    "direction": "output"
                  }
                ],
                "OperationName": "Create",
                "Resource": {"Path":
"../resources/application_9/inbound_10/
resourcegroup_11/CreateOrganization_REQUEST.jca"},
                "JCAFilePath":
"../resources/application_9/inbound_10/
resourcegroup_11/CreateOrganization_REQUEST.jca",
                "direction": "inbound"
              },
              "adapterType": "app-adapter"
            }
          ]
        },
        "id": "OSC_TO_ORN01.02.0000"
      }
```

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 17:
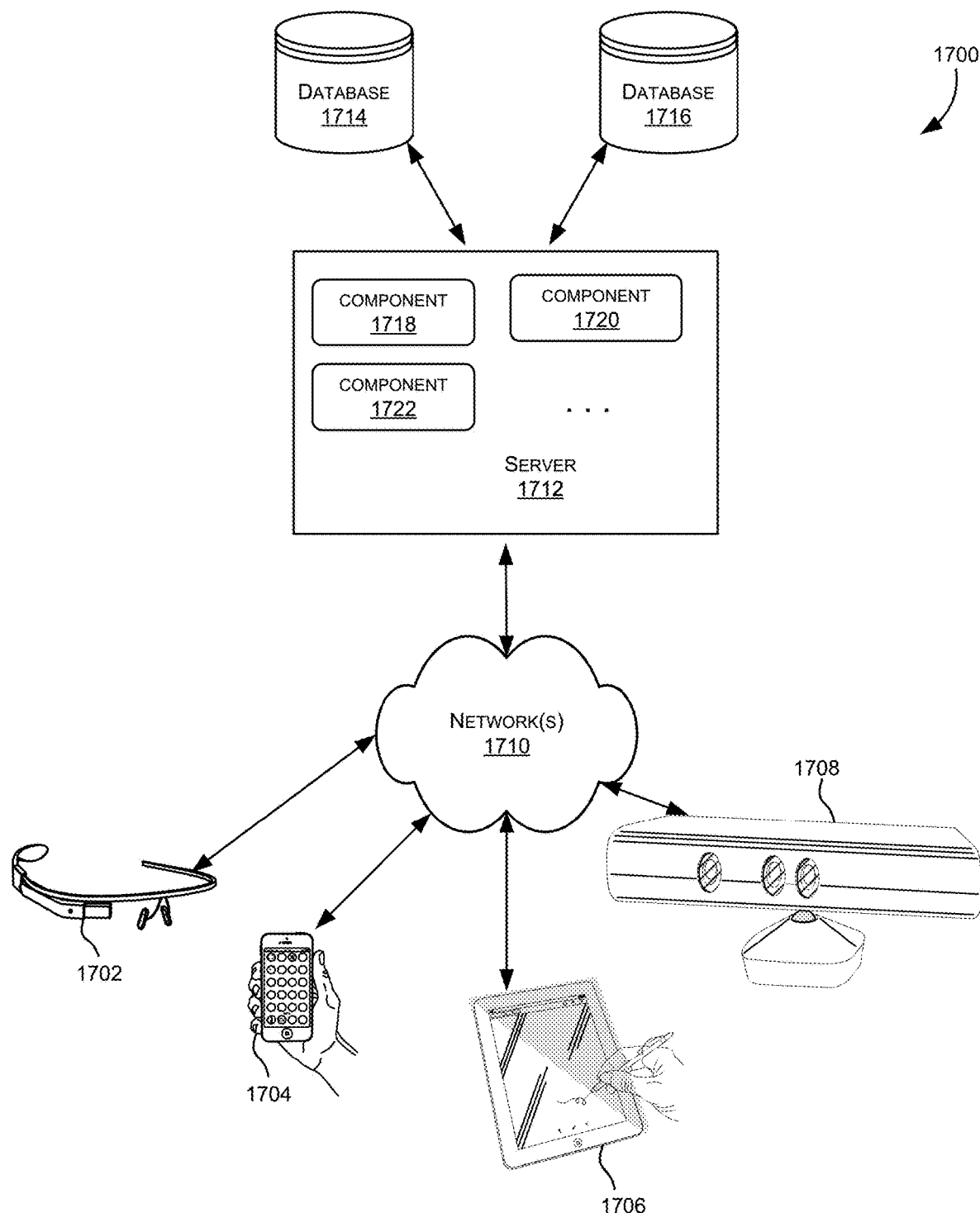
FIG. 17 illustrates a simplified block diagram of a distributed system for implementing some of the embodiments.

FIG. 17 depicts a simplified diagram of a distributed system 1700 for implementing one of the embodiments. In the illustrated embodiment, distributed system 1700 includes one or more client computing devices 1702, 1704, 1706, and 1708, which are configured to execute and operate a client application such as a web browser, proprietary client (e.g., Oracle Forms), or the like over one or more network(s) 1710. Server 1712 may be communicatively coupled with remote client computing devices 1702, 1704, 1706, and 1708 via network 1710.

In various embodiments, server 1712 may be adapted to run one or more services or software applications provided by one or more of the components of the system. In some embodiments, these services may be offered as web-based or cloud services or under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in the figure, the software components 1718, 1720 and 1722 of system 1700 are shown as being implemented on server 1712. In other embodiments, one or more of the components of system 1700 and/or the services provided by these components may also be implemented by one or more of the client computing devices 1702, 1704, 1706, and/or 1708. Users operating the client computing devices may then utilize one or more client applications to use the services provided by these components. These components may be implemented in hardware, firmware, software, or combinations thereof. It should be appreciated that various different system configurations are possible, which may be different from distributed system 1700. The embodiment shown in the figure is thus one example of a distributed system for implementing an embodiment system and is not intended to be limiting.

Client computing devices 1702, 1704, 1706, and/or 1708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1702, 1704, 1706, and 1708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1710.

Although exemplary distributed system 1700 is shown with four client computing devices, any number of client computing devices may be supported. Other devices, such as devices with sensors, etc., may interact with server 1712.

Network(s) 1710 in distributed system 1700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1710 can be a local area network (LAN), such as one based on Ethernet, Token-Ring and/or the like. Network(s) 1710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1712 may be adapted to run one or more services or software applications described in the foregoing disclosure. For example, server 1712 may correspond to a server for performing processing described above according to an embodiment of the present disclosure.

Server 1712 may run an operating system including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1712 may include one or more applications to analyze and consolidate data feeds and/or event updates received from users of client computing devices 1702, 1704, 1706, and 1708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1712 may also include one or more applications to display the data feeds and/or real-time events via one or more display devices of client computing devices 1702, 1704, 1706, and 1708.

Distributed system 1700 may also include one or more databases 1714 and 1716. Databases 1714 and 1716 may reside in a variety of locations. By way of example, one or more of databases 1714 and 1716 may reside on a non-transitory storage medium local to (and/or resident in) server 1712. Alternatively, databases 1714 and 1716 may be remote from server 1712 and in communication with server 1712 via a network-based or dedicated connection. In one set of embodiments, databases 1714 and 1716 may reside in a storage-area network (SAN). Similarly, any necessary files for performing the functions attributed to server 1712 may be stored locally on server 1712 and/or remotely, as appropriate. In one set of embodiments, databases 1714 and 1716 may include relational databases, such as databases provided by Oracle, that are adapted to store, update, and retrieve data in response to SQL-formatted commands.

Figure 18:
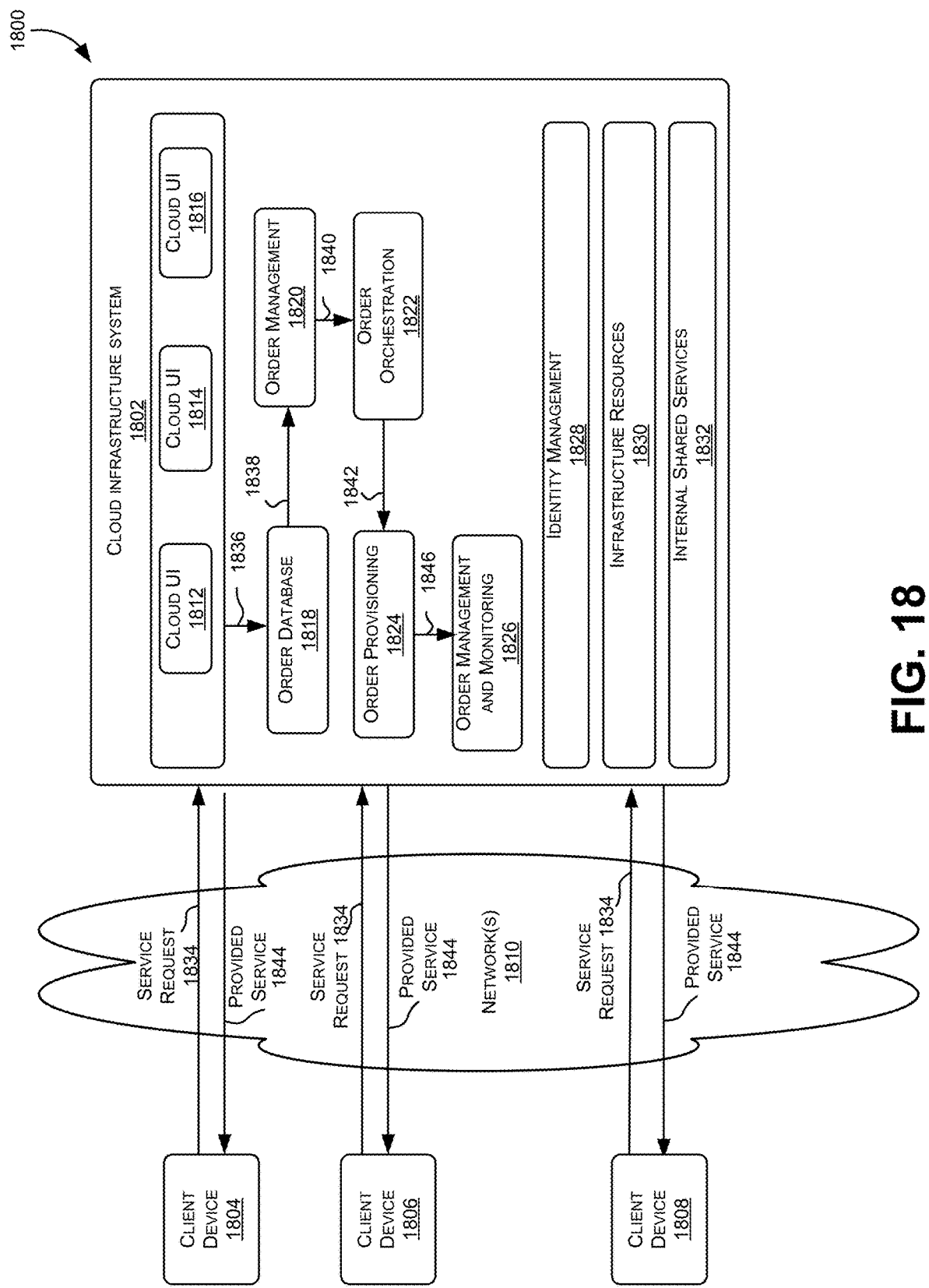
FIG. 18 illustrates a simplified block diagram of components of a system environment by which services provided by the components of an embodiment system may be offered as cloud services.

FIG. 18 is a simplified block diagram of one or more components of a system environment 1800 by which services provided by one or more components of an embodiment system may be offered as cloud services, in accordance with an embodiment of the present disclosure. In the illustrated embodiment, system environment 1800 includes one or more client computing devices 1804, 1806, and 1808 that may be used by users to interact with a cloud infrastructure system 1802 that provides cloud services. The client computing devices may be configured to operate a client application such as a web browser, a proprietary client application (e.g., Oracle Forms), or some other application, which may be used by a user of the client computing device to interact with cloud infrastructure system 1802 to use services provided by cloud infrastructure system 1802.

It should be appreciated that cloud infrastructure system 1802 depicted in the figure may have other components than those depicted. Further, the embodiment shown in the figure is only one example of a cloud infrastructure system that may incorporate an embodiment of the invention. In some other embodiments, cloud infrastructure system 1802 may have more or fewer components than shown in the figure, may combine two or more components, or may have a different configuration or arrangement of components.

Client computing devices 1804, 1806, and 1808 may be devices similar to those described above for 1702, 1704, 1706, and 1708.

Although exemplary system environment 1800 is shown with three client computing devices, any number of client computing devices may be supported. Other devices such as devices with sensors, etc. may interact with cloud infrastructure system 1802.

Network(s) 1810 may facilitate communications and exchange of data between clients 1804, 1806, and 1808 and cloud infrastructure system 1802. Each network may be any type of network familiar to those skilled in the art that can support data communications using any of a variety of commercially-available protocols, including those described above for network(s) 1710.

Cloud infrastructure system 1802 may comprise one or more computers and/or servers that may include those described above for server 1712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1802 may be adapted to automatically provision, manage and track a customer's subscription to services offered by cloud infrastructure system 1802. Cloud infrastructure system 1802 may provide the cloud services via different deployment models. For example, services may be provided under a public cloud model in which cloud infrastructure system 1802 is owned by an organization selling cloud services (e.g., owned by Oracle) and the services are made available to the general public or different industry enterprises. As another example, services may be provided under a private cloud model in which cloud infrastructure system 1802 is operated solely for a single organization and may provide services for one or more entities within the organization. The cloud services may also be provided under a community cloud model in which cloud infrastructure system 1802 and the services provided by cloud infrastructure system 1802 are shared by several organizations in a related community. The cloud services may also be provided under a hybrid cloud model, which is a combination of two or more different models.

In some embodiments, the services provided by cloud infrastructure system 1802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1802. Cloud infrastructure system 1802 then performs processing to provide the services in the customer's subscription order.

In some embodiments, the services provided by cloud infrastructure system 1802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1802 may also include infrastructure resources 1830 for providing the resources used to provide various services to customers of the cloud infrastructure system. In one embodiment, infrastructure resources 1830 may include pre-integrated and optimized combinations of hardware, such as servers, storage, and networking resources to execute the services provided by the PaaS platform and the SaaS platform.

In some embodiments, resources in cloud infrastructure system 1802 may be shared by multiple users and dynamically re-allocated per demand. Additionally, resources may be allocated to users in different time zones. For example, cloud infrastructure system 1830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1832 may be provided that are shared by different components or modules of cloud infrastructure system 1802 and by the services provided by cloud infrastructure system 1802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1802, and the like.

In one embodiment, as depicted in the figure, cloud management functionality may be provided by one or more modules, such as an order management module 1820, an order orchestration module 1822, an order provisioning module 1824, an order management and monitoring module 1826, and an identity management module 1828. These modules may include or be provided using one or more computers and/or servers, which may be general purpose computers, specialized server computers, server farms, server clusters, or any other appropriate arrangement and/or combination.

In exemplary operation 1834, a customer using a client device, such as client device 1804, 1806 or 1808, may interact with cloud infrastructure system 1802 by requesting one or more services provided by cloud infrastructure system 1802 and placing an order for a subscription for one or more services offered by cloud infrastructure system 1802. In certain embodiments, the customer may access a cloud User Interface (UI), cloud UI 1812, cloud UI 1814 and/or cloud UI 1816 and place a subscription order via these UIs. The order information received by cloud infrastructure system 1802 in response to the customer placing an order may include information identifying the customer and one or more services offered by the cloud infrastructure system 1802 that the customer intends to subscribe to.

After an order has been placed by the customer, the order information is received via the cloud UIs, 1812, 1814 and/or 1816.

At operation 1836, the order is stored in order database 1818. Order database 1818 can be one of several databases operated by cloud infrastructure system 1818 and operated in conjunction with other system elements.

At operation 1838, the order information is forwarded to an order management module 1820. In some instances, order management module 1820 may be configured to perform billing and accounting functions related to the order, such as verifying the order, and upon verification, booking the order.

At operation 1840, information regarding the order is communicated to an order orchestration module 1822. Order orchestration module 1822 may utilize the order information to orchestrate the provisioning of services and resources for the order placed by the customer. In some instances, order orchestration module 1822 may orchestrate the provisioning of resources to support the subscribed services using the services of order provisioning module 1824.

In certain embodiments, order orchestration module 1822 enables the management of business processes associated with each order and applies business logic to determine whether an order should proceed to provisioning. At operation 1842, upon receiving an order for a new subscription, order orchestration module 1822 sends a request to order provisioning module 1824 to allocate resources and configure those resources needed to fulfill the subscription order. Order provisioning module 1824 enables the allocation of resources for the services ordered by the customer. Order provisioning module 1824 provides a level of abstraction between the cloud services provided by cloud infrastructure system 1800 and the physical implementation layer that is used to provision the resources for providing the requested services. Order orchestration module 1822 may thus be isolated from implementation details, such as whether or not services and resources are actually provisioned on the fly or pre-provisioned and only allocated/assigned upon request.

At operation 1844, once the services and resources are provisioned, a notification of the provided service may be sent to customers on client devices 1804, 1806 and/or 1808 by order provisioning module 1824 of cloud infrastructure system 1802.

At operation 1846, the customer's subscription order may be managed and tracked by an order management and monitoring module 1826. In some instances, order management and monitoring module 1826 may be configured to collect usage statistics for the services in the subscription order, such as the amount of storage used, the amount data transferred, the number of users, and the amount of system up time and system down time.

In certain embodiments, cloud infrastructure system 1800 may include an identity management module 1828. Identity management module 1828 may be configured to provide identity services, such as access management and authorization services in cloud infrastructure system 1800. In some embodiments, identity management module 1828 may control information about customers who wish to utilize the services provided by cloud infrastructure system 1802. Such information can include information that authenticates the identities of such customers and information that describes which actions those customers are authorized to perform relative to various system resources (e.g., files, directories, applications, communication ports, memory segments, etc.) Identity management module 1828 may also include the management of descriptive information about each customer and about how and by whom that descriptive information can be accessed and modified.

Figure 19:
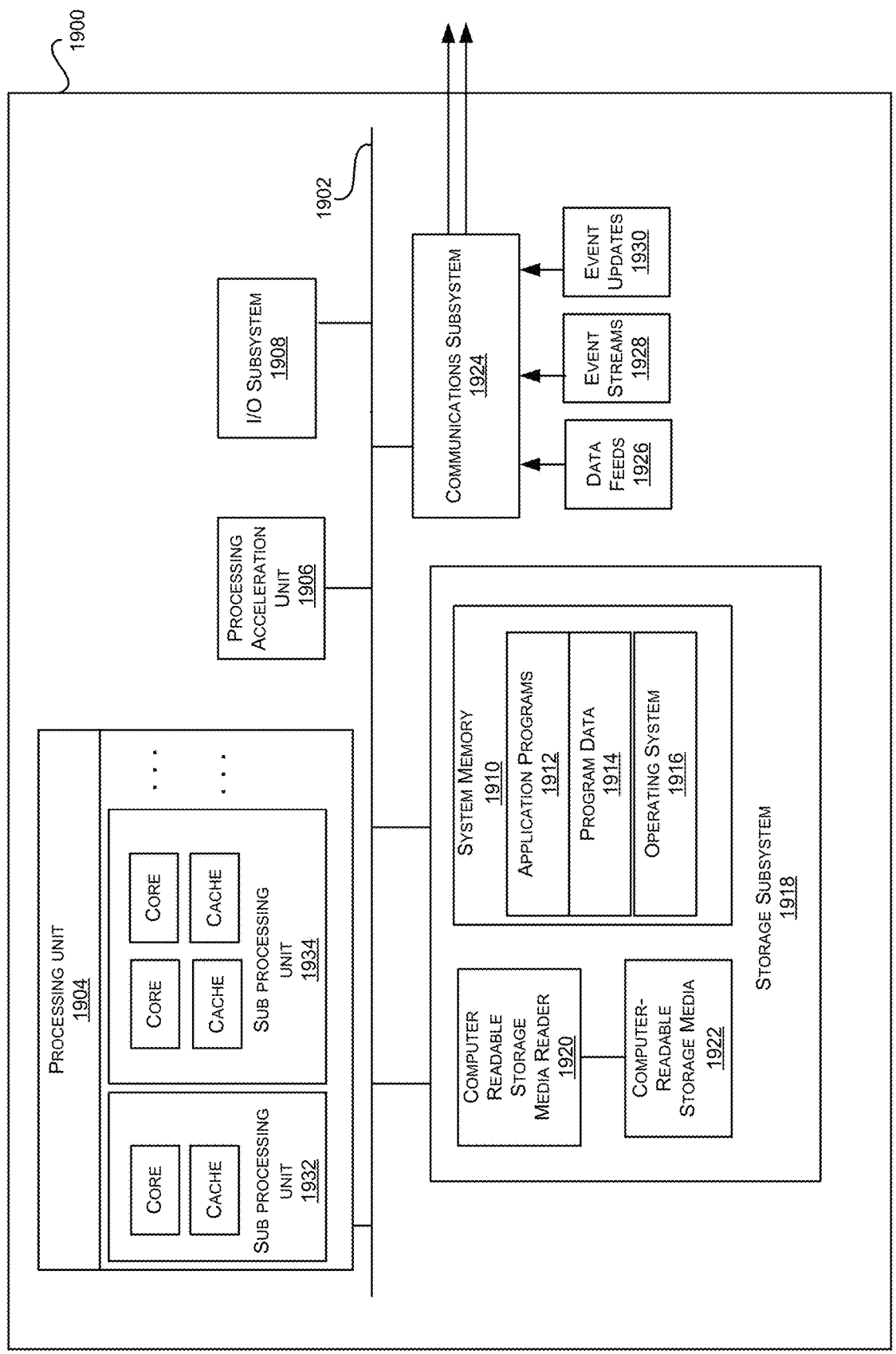
FIG. 19 illustrates an exemplary computer system, in which various embodiments may be implemented.

FIG. 19 illustrates an exemplary computer system 1900, in which various embodiments of the present invention may be implemented. The system 1900 may be used to implement any of the computer systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain embodiments, processing unit 1904 may be implemented as one or more independent processing units 1932 and/or 1934 with single or multicore processors included in each processing unit. In other embodiments, processing unit 1904 may also be implemented as a quad-core processing unit formed by integrating two dual-core processors into a single chip.

In various embodiments, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that comprises software elements, shown as being currently located within a system memory 1910. System memory 1910 may store program instructions that are loadable and executable on processing unit 1904, as well as data generated during the execution of these programs.

Depending on the configuration and type of computer system 1900, system memory 1910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1904. In some implementations, system memory 1910 may include multiple different types of memory, such as static random access memory (SRAM) or dynamic random access memory (DRAM). In some implementations, a basic input/output system (BIOS), containing the basic routines that help to transfer information between elements within computer system 1900, such as during start-up, may typically be stored in the ROM. By way of example, and not limitation, system memory 1910 also illustrates application programs 1912, which may include client applications, Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1918 may also provide a tangible computer-readable storage medium for storing the basic programming and data constructs that provide the functionality of some embodiments. Software (programs, code modules, instructions) that when executed by a processor provide the functionality described above may be stored in storage subsystem 1918. These software modules or instructions may be executed by processing unit 1904. Storage subsystem 1918 may also provide a repository for storing data used in accordance with the present invention.

Storage subsystem 1900 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for temporarily and/or more permanently containing, storing, transmitting, and retrieving computer-readable information.

Computer-readable storage media 1922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1900.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some embodiments communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1924 can provide wired network connectivity (e.g., Ethernet) in addition to or instead of a wireless interface.

In some embodiments, communications subsystem 1924 may also receive input communication in the form of structured and/or unstructured data feeds 1926, event streams 1928, event updates 1930, and the like on behalf of one or more users who may use computer system 1900.

By way of example, communications subsystem 1924 may be configured to receive data feeds 1926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of generating and using metadata files for completing integration flows, the method comprising:
 generating a plurality of metadata files for a plurality of existing integration flows by, for each existing integration flow:
  receiving one or more definition files defining the existing integration flow; and
  analyzing each of the one or more definition files to generate a metadata file for the existing integration flow comprising summary information for the existing integration flow;

extracting a plurality of source-target relationships from the summary information for each of the plurality of integration flows;
training a model using the plurality of source-target relationships;
receiving a source element from a current integration flow;
providing the source element and one or more characteristics of the current integration flow to the model;
receiving, from the model, a plurality of recommended target elements to be connected to the source element in the current integration flow;
receiving a selection of a target element from the plurality of recommended target elements to be connected to the source element and added to the current integration flow, wherein the target element uses an object input and performs an operation on the object input;
providing the target element to a second model that is trained using a plurality of object-target relationships from the summary information for each of the plurality of integration flows; and
receiving, from the second model, a plurality of recommended objects to be processed by the target element in the current integration flow.

2. The method of claim 1, wherein the plurality of recommended target elements comprises an ordered list of recommended target elements.

3. The method of claim 2, wherein an ordering of the ordered list of recommended target elements is determined by the model.

4. The method of claim 1, wherein the model comprises a neural network.

5. The method of claim 1, further comprising:
extracting a plurality of object-target relationships from the summary information for each of the plurality of integration flows;
training a third model using the plurality of object-target relationships;
receiving an object element from the current integration flow;
providing the object and the one or more characteristics of the current integration flow to the second model; and
receiving, from the third model, a plurality of recommended target elements to be used to process the object in the current integration flow.

6. The method of claim 1, further comprising:
extracting the plurality of object-target relationships from the summary information for each of the plurality of integration flows; and
training the second model using the plurality of object-target relationships.

7. The method of claim 1, wherein the integration flow comprises a plurality of elements that are executed sequentially.

8. The method of claim 7, wherein a metadata file in the plurality of metadata files comprises a characterization and count of each type of element in a corresponding integration flow.

9. The method of claim 1, wherein the metadata file comprises a count of a number of each type of processor used in the corresponding existing integration flow.

10. The method of claim 9, f the number of each type of processor used in the corresponding existing integration flow comprises a number of message trackers, a number of transformers, a number of sources, and a number of targets.

11. The method of claim 1, wherein a metadata file in the plurality of metadata files comprises a plurality of smart tags that characterize elements of a corresponding integration flow.

12. The method of claim 11, wherein the smart tags are generated automatically by parsing ones of the plurality of definition files for the corresponding integration flow and identifying characteristics associated with the plurality of smart tags.

13. A non-transitory computer-readable medium comprising instructions that, when executed by one or more processors, cause the one or more processors to perform operations comprising:
generating a plurality of metadata files for a plurality of existing integration flows by, for each existing integration flow:
receiving one or more definition files defining the existing integration flow; and
analyzing each of the one or more definition files to generate a metadata file for the existing integration flow comprising summary information for the existing integration flow;
extracting a plurality of source-target relationships from the summary information for each of the plurality of integration flows;
training a model using the plurality of source-target relationships;
receiving a source element from a current integration flow;
providing the source element and one or more characteristics of the current integration flow to the model;
receiving, from the model, a plurality of recommended target elements to be connected to the source element in the current integration flow;
receiving a selection of a target element from the plurality of recommended target elements to be connected to the source element and added to the current integration flow, wherein the target element uses an object input and performs an operation on the object input;
providing the target element to a second model that is trained using a plurality of object-target relationships from the summary information for each of the plurality of integration flows; and
receiving, from the second model, a plurality of recommended objects to be processed by the target element in the current integration flow.

14. The non-transitory computer-readable medium of claim 13, wherein the plurality of recommended target elements comprises an ordered list of recommended target elements.

15. The non-transitory computer-readable medium of claim 13, wherein an ordering of the ordered list of recommended target elements is determined by the model.

16. The non-transitory computer-readable medium of claim 13, wherein the operations further comprise:
extracting a plurality of object-target relationships from the summary information for each of the plurality of integration flows;
training a third model using the plurality of object-target relationships;
receiving an object element from the current integration flow;
providing the object and the one or more characteristics of the current integration flow to the second model; and
receiving, from the third model, a plurality of recommended target elements to be used to process the object in the current integration flow.

17. The non-transitory computer-readable medium of claim 13, wherein the operations further comprise:
    extracting the plurality of object-target relationships from the summary information for each of the plurality of integration flows; and
    training the second model using the plurality of object-target relationships.

18. A system comprising:
    one or more processors; and
    one or more memory devices comprising instructions that, when executed by the one or more processors, cause the one or more processors to perform operations comprising:
        generating a plurality of metadata files for a plurality of existing integration flows by, for each existing integration flow:
            receiving one or more definition files defining the existing integration flow; and
            analyzing each of the one or more definition files to generate a metadata file for the existing integration flow comprising summary information for the existing integration flow;
        extracting a plurality of source-target relationships from the summary information for each of the plurality of integration flows;
        training a model using the plurality of source-target relationships;
        receiving a source element from a current integration flow;
        providing the source element and one or more characteristics of the current integration flow to the model;
        receiving, from the model, a plurality of recommended target elements to be connected to the source element in the current integration flow;
        receiving a selection of a target element from the plurality of recommended target elements to be connected to the source element and added to the current integration flow, wherein the target element uses an object input and performs an operation on the object input;
        providing the target element to a second model that is trained using a plurality of object-target relationships from the summary information for each of the plurality of integration flows; and
        receiving, from the second model, a plurality of recommended objects to be processed by the target element in the current integration flow.

19. The system of claim 18, wherein the operations further comprise:
    extracting a plurality of object-target relationships from the summary information for each of the plurality of integration flows;
    training a third model using the plurality of object-target relationships;
    receiving an object element from the current integration flow;
    providing the object and the one or more characteristics of the current integration flow to the second model; and
    receiving, from the third model, a plurality of recommended target elements to be used to process the object in the current integration flow.

20. The system of claim 18, wherein the operations further comprise:
    extracting the plurality of object-target relationships from the summary information for each of the plurality of integration flows; and
    training the second model using the plurality of object-target relationships.

* * * * *

UNITED STATES PATENT AND TRADEMARK OFFICE
CERTIFICATE OF CORRECTION

PATENT NO. : 11,790,224 B2
APPLICATION NO. : 16/657556
DATED : October 17, 2023
INVENTOR(S) : Modi et al.

It is certified that error appears in the above-identified patent and that said Letters Patent is hereby corrected as shown below:

On the Title Page

On page 2, Column 1, under Other Publications, Line 3, delete "lntegration" and insert
-- Integration --, therefor.

On page 2, Column 1, under Other Publications, Line 6, delete "at" and insert -- at: --, therefor.

In the Drawings

On sheet 3 of 20, in FIG. 3, and on the title page, the illustrative print figure, under Reference Numeral 316, Line 1, delete "DPIC" and insert -- DIC --, therefor.

In the Specification

In Column 28, Line 42, delete "evolution)," and insert -- evolution)), --, therefor.

In the Claims

In Column 31, Line 64, in Claim 10, delete "f the" and insert -- the --, therefor.

Signed and Sealed this
Thirtieth Day of July, 2024

Katherine Kelly Vidal
*Director of the United States Patent and Trademark Office*